(12) United States Patent
Yoneno et al.

(10) Patent No.: US 9,791,708 B2
(45) Date of Patent: Oct. 17, 2017

(54) DISPLAY APPARATUS

(71) Applicant: SEIKO EPSON CORPORATION, Tokyo (JP)

(72) Inventors: Kunio Yoneno, Shiojiri (JP); Tomio Sonehara, Shiojiri (JP); Takashi Endo, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 288 days.

(21) Appl. No.: 14/728,566

(22) Filed: Jun. 2, 2015

(65) Prior Publication Data

US 2015/0355471 A1     Dec. 10, 2015

(30) Foreign Application Priority Data

Jun. 10, 2014  (JP) ................. 2014-119346
Jun. 10, 2014  (JP) ................. 2014-119347

(51) Int. Cl.
    *G02B 5/13*      (2006.01)
    *G02B 27/22*     (2006.01)
    *G02B 27/00*     (2006.01)
    *G03B 35/20*     (2006.01)
    *G03B 21/10*     (2006.01)
    *H04N 13/04*     (2006.01)
    (Continued)

(52) U.S. Cl.
    CPC .......... *G02B 27/2214* (2013.01); *G02B 5/13* (2013.01); *G02B 27/0093* (2013.01); *G03B 21/10* (2013.01); *G03B 21/60* (2013.01); *G03B 21/606* (2013.01); *G03B 35/20* (2013.01); *G03B 37/04* (2013.01); *H04N 13/0459* (2013.01); *H04N 13/0468* (2013.01); *H04N 13/0497* (2013.01); *H04N 2213/006* (2013.01)

(58) Field of Classification Search
    CPC .. G02B 27/0093; G02B 27/2214; G02B 5/13; G03B 21/10; H04N 13/0459
    See application file for complete search history.

(56) References Cited

U.S. PATENT DOCUMENTS 6,644,816 B1     11/2003  Perra et al.
2007/0064201 A1   3/2007  Hoshino et al.
(Continued)

FOREIGN PATENT DOCUMENTS

CN     1311888 A      9/2001
CN   101762882 A      6/2010
(Continued)

*Primary Examiner* — Behrooz Senfi
(74) *Attorney, Agent, or Firm* — Oliff PLC

(57) ABSTRACT

A display apparatus includes a screen formed in an arcuate shape centering on a center axis and a projection device configured to project, along projecting directions orthogonal to the center axis and different from one another, images corresponding to the projecting directions on the inner circumferential surface or the outer circumferential surface of the screen. The screen includes a retroreflective layer having a reflection surface directed to the projection device and a diffusion layer arranged on the projection device side with respect to the retroreflective layer and configured to diffuse, when transmitting light made incident from the retroreflective layer, the light wider in a first direction along the center axis than in a second direction, which is a circumferential direction centering on the center axis.

13 Claims, 30 Drawing Sheets

(51) Int. Cl.
*G03B 21/60* (2014.01)
*G03B 21/606* (2014.01)
*G03B 37/04* (2006.01)

(56) References Cited

U.S. PATENT DOCUMENTS

| | | | |
|---|---|---|---|
| 2008/0036969 A1* | 2/2008 | Otsuka | G02B 27/2271 353/7 |
| 2011/0069157 A1 | 3/2011 | Ito et al. | |
| 2011/0234772 A1 | 9/2011 | Ito et al. | |

FOREIGN PATENT DOCUMENTS

| | | | |
|---|---|---|---|
| CN | 101982806 A | 3/2011 | |
| CN | 102239438 A | 11/2011 | |
| JP | 2006-010852 A | 1/2006 | |
| JP | 3955582 B2 | 8/2007 | |
| JP | 2010-032952 A | 2/2010 | |
| JP | 5099554 B2 | 12/2012 | |
| KR | WO 2012173426 A2 * | 12/2012 | ............ G03B 37/04 |

* cited by examiner

DISPLAY APPARATUS

BACKGROUND

1. Technical Field

The present invention relates to a display apparatus.

2. Related Art

There has been known a display apparatus that includes a cylindrical housing, displays an image corresponding to the position of an observer who moves in the circumferential direction of the housing, and causes the observer to stereoscopically visually recognize an image through the motion parallax (see, for example, Japanese Patent No. 3955582 (Patent Literature 1)).

The display apparatus according to Patent Literature 1 includes an electronic projector, a rotary mechanism section, a screen, a mirror, and a polygonal mirror. In the display apparatus, the electronic projector projects a projection image in which frame pictures, which are respectively pictures of the same object viewed from different positions, are arrayed in a ring shape. The projection image is turned back by the mirror. The frame pictures included in the turned-back projection image are respectively made incident on the annular polygonal mirror surrounding the screen. The polygonal mirror includes a group of a plurality of mirrors. The plurality of mirrors respectively reflect the incident frame pictures toward the screen.

The screen is rotated about the center axis of the housing by the rotary mechanism section. When the frame pictures made incident from the mirrors of the polygonal mirror are rotated to positions opposed to the mirrors, the mirrors reflect the frame pictures. A screen includes a viewing angle limiting filter that limits a viewing angle. The screen is configured to enable the observer to view, from the position of the observer, only the frame pictures corresponding to a direction in which the observer observes the screen. Therefore, when the observer observes the screen while moving along the circumferential direction of the display apparatus and changing a visual point, the observer can observe different frame pictures corresponding to the positions of respective visual points. Consequently, the observer can stereoscopically visually recognize an object included in an image through the motion parallax.

However, in the display apparatus described in Patent Literature 1, frame pictures, which are parts of projection images from one or a plurality of projectors are respectively reflected on the polygonal mirror and made incident on the screen. Therefore, an image observed by the observer is only a small region of pictures (the projection images) projected by the projectors. Therefore, the resolution of an image visually recognized by the observer is low and the image is blurred.

SUMMARY

An advantage of some aspects of the invention is to provide a display apparatus that can display a clear stereoscopic image.

A display apparatus according to a first aspect of the invention includes: a screen formed in an arcuate shape centering on a center axis; and a projection device includes a plurality of projecting sections configured to project images corresponding to projecting directions on the inner circumferential surface of the screen along the projecting directions orthogonal to the center axis and different from one another. The screen includes: a retroreflective layer having a reflection surface directed to the projection device; and a diffusion layer arranged on the projection device side with respect to the retroreflective layer and configured to diffuse, when transmitting light made incident from the retroreflective layer, the light wider in a first direction along the center axis than in a second direction, which is a circumferential direction centering on the center axis.

Note that the display apparatus is arranged such that, for example, the center axis of the arcuate screen extends along the vertical direction. In this case, the first direction is a direction along the vertical direction and the second direction is a direction along the horizontal direction. Further, the arcuate screen may be a screen having a semi-cylindrical shape or a cylindrical shape.

According to the first aspect, the image projected on the inner circumferential surface of the screen from the projection device is reflected on the retroreflective layer configuring the screen and is diffused by the diffusion layer. The diffusion layer diffuses light wide in the first direction and narrow in the second direction. Therefore, the light reflected by the screen is collected at a certain visual point (e.g., a visual point on a straight line extending along the first direction and passing a projection position of the image in the projection device (a pupil position of a projection optical device) in the projection device. When the eyes of an observer are located at the visual point, the observer can visually recognize the image.

The projection device projects the images corresponding to the projecting directions on the inner circumferential surface along the projecting directions orthogonal to the center axis and different one another. Therefore, for example, the projection device projects images of an observation target stereoscopic image, which are respectively viewed from different observation directions, respectively along projecting directions corresponding to the observation directions. Consequently, the observer can visually recognize an image of the observation target observed from a direction corresponding to the position of the observer. Therefore, the observer can stereoscopically view the observation target through the motion parallax.

The projection device can project one image along the projecting directions. Therefore, compared with the configuration for projecting partial images included in one image according to the projecting directions as explained above, it is possible to increase the resolution of a projection image. Therefore, it is possible to clearly display an image that can be stereoscopically viewed.

In the first aspect, it is preferable that the projection device includes a plurality of projecting sections respectively arranged on an imaginary circle centering on the center axis and configured to project, along the projecting directions different from one another, images corresponding to the projecting directions on the inner circumferential surface.

According to the first aspect, since the projection device includes the plurality of projecting sections, the projection device can surely display, on the inner circumferential surface, images of the observation target viewed from directions corresponding to arrangement positions of the projecting sections. Therefore, the observer can stereoscopically visually recognize the observation target included in the respective projection images through the motion parallax by changing the position of the observer.

The plurality of projecting sections arranged on the imaginary circle respectively project the images on the inner circumferential surface. Therefore, even when there are a plurality of observers, the observers can visually recognize the images.

In the first aspect, it is preferable that the plurality of projecting sections are arranged on one of one end side and the other end side in the first direction with respect to the screen.

According to the first aspect, since the plurality of projecting sections are arranged on one of one end side and the other end side in the first direction with respect to the screen, it is possible to project image light inclined with respect to the screen. Consequently, the image light reflected by the screen can be surely made incident on the eyes of the observer. The observers can surely visually recognize the images.

In the first aspect, it is preferable that the display apparatus further includes: a position detecting section configured to detect the position of an observer who observes the inner circumferential surface; a turning section configured to relatively turn the screen and the projection device about the center axis in a state in which the projection device can project the image on the inner circumferential surface; and a turning control section configured to control the turning section on the basis of a detection result by the position detecting section to enable the observer to observe the image projected on the inner circumferential surface, and the projection device projects the image corresponding to the position of the observer.

According to the first aspect, the projection device and the screen are turned to enable the observer to observe an image projected by the projection device in the position of the observer detected by the position detecting section. The projection device projects the image corresponding to the position of the observer, that is, an image corresponding to a direction in which the position of the observer faces the observation target. Therefore, the turning section turns the projection device and the screen to follow the movement of the observer and the projection device projects the image corresponding to the position of the observer. Consequently, as explained above, the observer can stereoscopically visually recognize the observation target included in the projection images through the motion parallax.

In the first aspect, it is preferable that the position detecting section includes: a sensor configured to detect the position of the observer with respect to the screen; a camera configured to take an image of the observer detected by the sensor; and a specifying section configured to specify the position of a predetermined part of the observer on the basis of the picked-up image taken by the camera, and the projection device projects the image corresponding to the predetermined part of the detected observer.

Note that, as the predetermined part of the observer, the face of the observer can be illustrated and, more specifically, the eyes that visually recognize the image can be illustrated.

According to the first aspect, the camera take an image of the observer detected by the sensor. Therefore, for example, if the camera turns according to the turning of the turning section, it is possible to take an image of the predetermined part of the observer by providing one camera more expensive than the sensor. Consequently, the specifying section can specify the position of the predetermined part of the observer. Therefore, since the number of cameras can be reduced, it is possible to reduce manufacturing costs of the display apparatus. Further, since the projection device projects an image corresponding to the position of the observer's face, the observer can visually recognize a clearer stereoscopic image.

In the first aspect, it is preferable that the display apparatus further includes a reflection member configured to reflect image light projected from the projection device toward a projection position corresponding to the image light among a plurality of projection positions on the inner circumferential surface, and the projection device and the reflection member are arranged in an imaginary circle centering on the center axis and having a diameter dimension same as a diameter dimension of the screen.

According to the first aspect, the image light projected from the projection device is reflected toward the projection position corresponding to the image light. Therefore, the projection device and the reflection member can be arranged in the imaginary circle having the diameter dimension same as the diameter dimension of the screen. Consequently, compared with when the projection device is arranged on the outer circumferential surface side of the screen, it is possible to reduce the size of the display apparatus.

In the first aspect, it is preferable that an arrangement interval of projecting sections adjacent to each other among the plurality of projecting sections is set such that an image projected from one of the adjacent projecting sections is observed by the right eye of an observer who observes the screen and an image projected from the other is observed by the left eye of the observer.

Note that, as the arrangement interval, approximately 65 mm, which is the amplitude of convergence of the human eyes, is illustrated.

The screen includes the retroreflective layer and includes the diffusion layer that diffuses light wide in the first direction compared with the second direction. Therefore, as explained above, lights of images projected from the projecting sections are reflected by the screen and collected in positions on straight lines extending along the first direction and passing pupil positions of the projecting sections. An image projected from one of the projecting sections adjacent to each other is reflected by the screen and observed by the right eye of the observer and an image projected from the other is reflected by the screen and observed by the left eye of the observer. Consequently, by observing the projection images by the projecting sections as parallax images, the observer can stereoscopically visually recognize the observation target included in the respective projection images through the binocular parallax.

A display apparatus according to a second aspect of the invention includes: a screen formed in an arcuate shape centering on a center axis; and a projection device configured to project, along projecting directions orthogonal to the center axis and different from one another, images corresponding to the projecting directions on the outer circumferential surface of the screen. The screen includes: a retroreflective layer having a reflection surface directed to the projection device; and a diffusion layer arranged on the projection device side with respect to the retroreflective layer and configured to diffuse, when transmitting light made incident from the retroreflective layer, the light wider in a first direction along the center axis than in a second direction, which is a circumferential direction centering on the center axis.

Note that the display apparatus is arranged such that, for example, the center axis of the arcuate screen extends along the vertical direction. In this case, the first direction is a direction along the vertical direction and the second direction is a direction along the horizontal direction. Further, the screen formed in the arcuate shape may be a screen having a cylindrical shape.

According to the second aspect, the image projected on the outer circumferential surface of the screen from the projection device is reflected on the retroreflective layer configuring the screen and is diffused by the diffusion layer.

The diffusion layer diffuses light wide in the first direction and narrow in the second direction. Therefore, the light reflected by the screen is collected at a certain visual point (e.g., a visual point on a straight line extending along the first direction and passing a projection position of the image in the projection device (a pupil position of a projection optical device) in the projection device. When the eyes of an observer are located at the visual point, the observer can visually recognize the image. The projection device projects, along the projecting directions orthogonal to the center axis and different one another, the images corresponding to the projecting directions on the outer circumferential surface.

Therefore, for example, the projection device projects images of an observation target stereoscopic image, which are respectively viewed from different observation directions, respectively along projecting directions corresponding to the observation directions. Consequently, the observer can visually recognize an image of the observation target observed from a direction corresponding to the position of the observer. Therefore, the observer can stereoscopically view the observation target through the motion parallax.

The projection device can project one image along the projecting directions. Therefore, compared with the configuration for projecting partial images included in one image according to the projecting directions as explained above, it is possible to increase the resolution of a projection image. Therefore, it is possible to clearly display an image that can be stereoscopically viewed.

In the second aspect, it is preferable that the projection device includes a plurality of projecting sections respectively arranged along an imaginary circle centering on the center axis and configured to project, along the projecting directions different from one another, images corresponding to the projecting directions on the outer circumferential surface.

According to the second aspect, since the projection device includes the plurality of projecting sections, the projection device can surely display, on the outer circumferential surface, images of the observation target viewed from directions corresponding to arrangement positions of the projecting sections. Therefore, the observer can stereoscopically visually recognize the observation target included in the respective projection images through the motion parallax by changing the position of the observer.

The plurality of projecting sections arranged on the imaginary circle respectively project the images on the outer circumferential surface. Therefore, even when there are a plurality of observers, the observers can visually recognize the images.

In the second aspect, it is preferable that the display apparatus further includes a holding section that holds the plurality of projecting sections in a position higher than the positions of the screen and an observer who observes the screen.

According to the second aspect, the plurality of projecting sections are held by the holding section in the position higher than the positions of the screen and the head of the observer. Consequently, compared with when the plurality of projecting sections are held in a position lower than the positions of the screen and the head of the observer, the observer can move closer to the screen. Therefore, it is possible to prevent the plurality of projecting sections from hindering the observation of the screen.

In the second aspect, it is preferable that the display apparatus includes: an observer detecting section configured to detect an observer who observes the outer circumferential surface; a determining section configured to determine whether the observer is detected by the observer detecting section; and a control section configured to cause, when the determining section determines that the observer is detected, the plurality of projecting sections to respectively project images corresponding to the projecting directions on the outer circumferential surface and cause, when the determining section determines that the observer is not detected, the plurality of projecting sections to project images different from the images corresponding to the projecting directions on the outer circumferential surface.

Note that, as the images different from the images corresponding to the projecting directions, an image having a single color of black, an image of a representative visual point, and the like can be illustrated.

According to the second aspect, when the observer is detected by the observer detecting section, images of the observation target viewed from the respective positions of the projecting sections (the images corresponding to the projecting directions) are respectively projected on the outer circumferential surface from the plurality of projecting sections. Therefore, the observer can visually recognize an image observed from a direction corresponding to the position of the observer. On the other hand, when the observer is not detected by the observer detecting section, that is, when the observer is away from the screen, images different from the images of the observation target viewed from the respective positions of the projecting sections (the images corresponding to the projecting directions) are respectively projected on the outer circumferential surface from the plurality of projecting sections. Consequently, it is possible to display images corresponding to presence and absence of the observer in a detection range.

If the different images have a single color of black, the screen can be made less conspicuous.

On the other hand, if the different images are, for example, images of a representative visual point, when the observer approaches the screen, since images corresponding to the positions of the projecting sections are respectively projected from the plurality of projecting sections, the observer can visually recognize images different from one another according to the positions of the observer. Therefore, it is possible to attract interest of the observer. That is, it is possible to execute an effective advertisement on the screen.

In the second aspect, it is preferable that the display apparatus further includes: an observer detecting section configured to detect an observer who observes the outer circumferential surface; a determining section configured to determine whether the observer is detected by the observer detecting section; and a control section configured to turn off, when the determining section determines that the observer is not detected, a power supply of at least any one projecting section among the plurality of projecting sections.

According to the second aspect, when the observer is not detected by the observer detecting section, that is, when the observer is away from the screen, the power supply of at least any one projecting section among the plurality of projecting sections is turned off. Therefore, in such a case, it is possible to attain power saving of the display apparatus.

In the second aspect, it is preferable that an arrangement interval of projecting sections adjacent to each other among the plurality of projecting sections is set such that an image projected from one of the adjacent projecting sections is observed by the right eye of an observer who observes the screen and an image projected from the other is observed by the left eye of the observer.

Note that, as the arrangement interval, approximately 65 mm, which is the amplitude of convergence of the human eyes, is illustrated.

The screen includes the retroreflective layer and includes the diffusion layer that diffuses light wide in the first direction compared with the second direction. Therefore, as explained above, lights of images projected from the projecting sections are reflected by the screen and collected in positions on straight lines extending along the first direction and passing pupil positions of the projecting sections. An image projected from one of the projecting sections adjacent to each other is reflected by the screen and observed by the right eye of the observer and an image projected from the other is reflected by the screen and observed by the left eye of the observer. In this case, when the projection images are projected by the projecting sections as parallax images, the observer can stereoscopically visually recognize the observation target included in the respective projection images through the binocular parallax.

In the second aspect, it is preferable that the display screen further includes an attachment member configured to detachably attach the screen formed in a sheet shape to a columnar body.

According to the second aspect, by attaching the screen to the columnar body by the attachment member, it is possible to display a stereoscopic image centering on the columnar body. Therefore, an existing pillar can be used. It is possible to cause the observer to unprecedentedly feel as if a solid object is present on the inside of the pillar.

Since the existing pillar can be used, complicated work is unnecessary. The existing pillar can be used as the screen. For example, by attaching the screen to a columnar pillar in a station, the pillar can be used as an advertisement medium. Further, since the display apparatus includes the attachment member, it is possible to quickly and easily execute installation and removal of a sheet-like screen.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention is explained with reference to the drawings.

Schematic Configuration of a Display Apparatus

Figure 1:
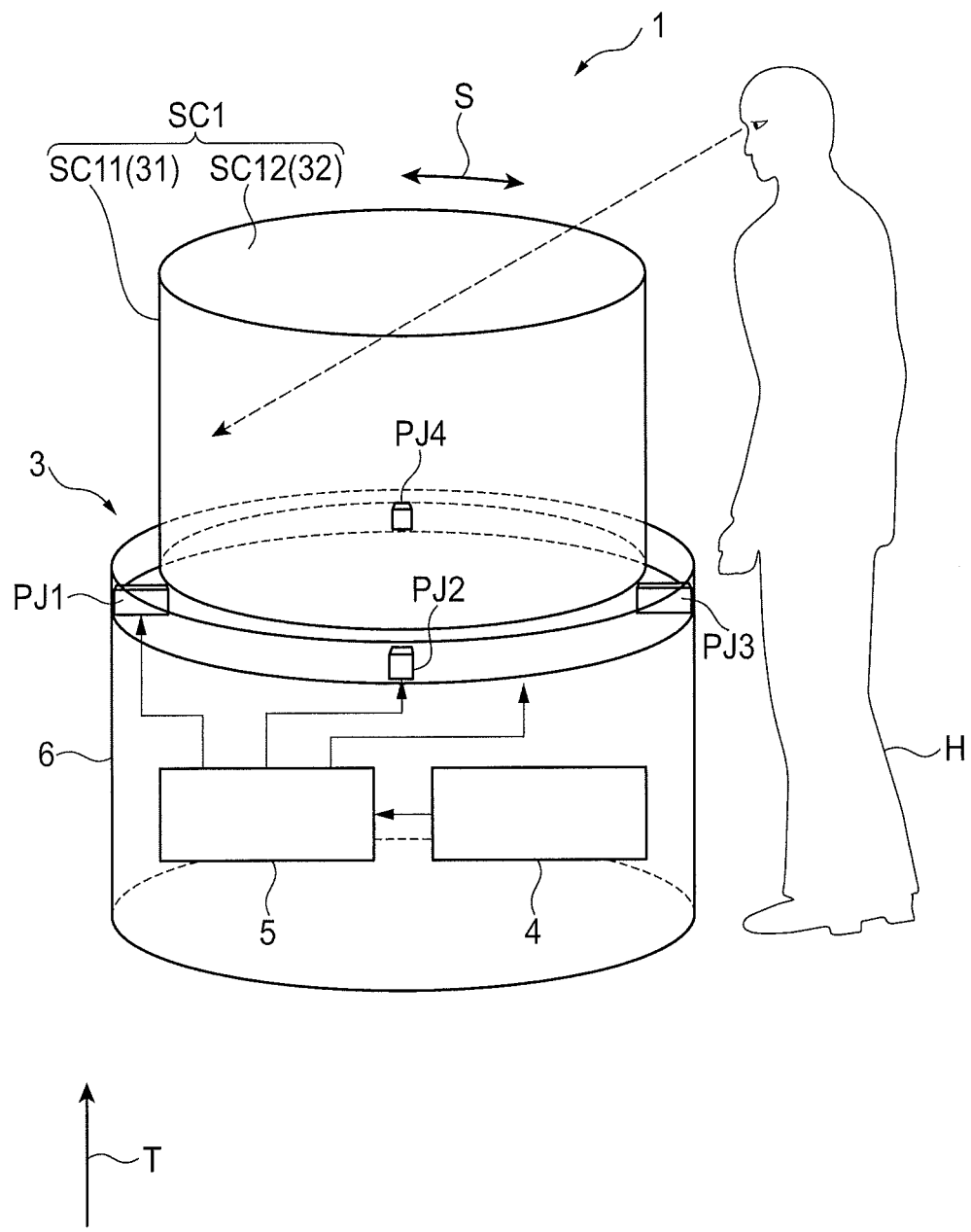
FIG. 1 is a schematic diagram showing the external view of a display apparatus according to a first embodiment of the invention.

FIG. 1 is a schematic diagram showing the external appearance of a display apparatus 1 according to this embodiment. In the following figures and explanation, a direction along a center axis C of a screen SC1 is represented as a T direction (a first direction) and a circumferential direction centering on the center axis is represented as an S direction (a second direction).

The display apparatus 1 according to this embodiment displays an image of an observation target observed from the position of an observer H and causes the observer H to stereoscopically visually recognize the observation target through the motion parallax. The display apparatus 1 includes the screen SC1, a projection device 3, a storage device 4, a display control device 5, and a stand 6.

The stand 6 is a pedestal that supports the screen SC1 and the projection device 3 (projecting sections PJ) and on which the storage device 4 and the display control device 5 are provided.

Configurations of the Storage Device and the Display Control Device

The storage device 4 stores image information of an image projected by the projection device 3. As the storage device 4, a storage device having a relatively large capacity such as a HDD (Hard Disk Drive) can be illustrated.

The display control device 5 is equivalent to the control section according to the invention. The display control device 5 causes the storage device 4 to store image information received from an external apparatus via a network or the like, forms an image, which the display control, device 5 causes the projection device 3 to project, from the image information stored in the storage device 4, and transmits the image to the projection device 3. Specifically, the display control device 5 transmits information concerning images (image data), which the display control device 5 causes the projecting sections PJ configuring the projection device 3 to project, to each of the projecting sections PJ.

Configuration of the Screen

Figure 2:
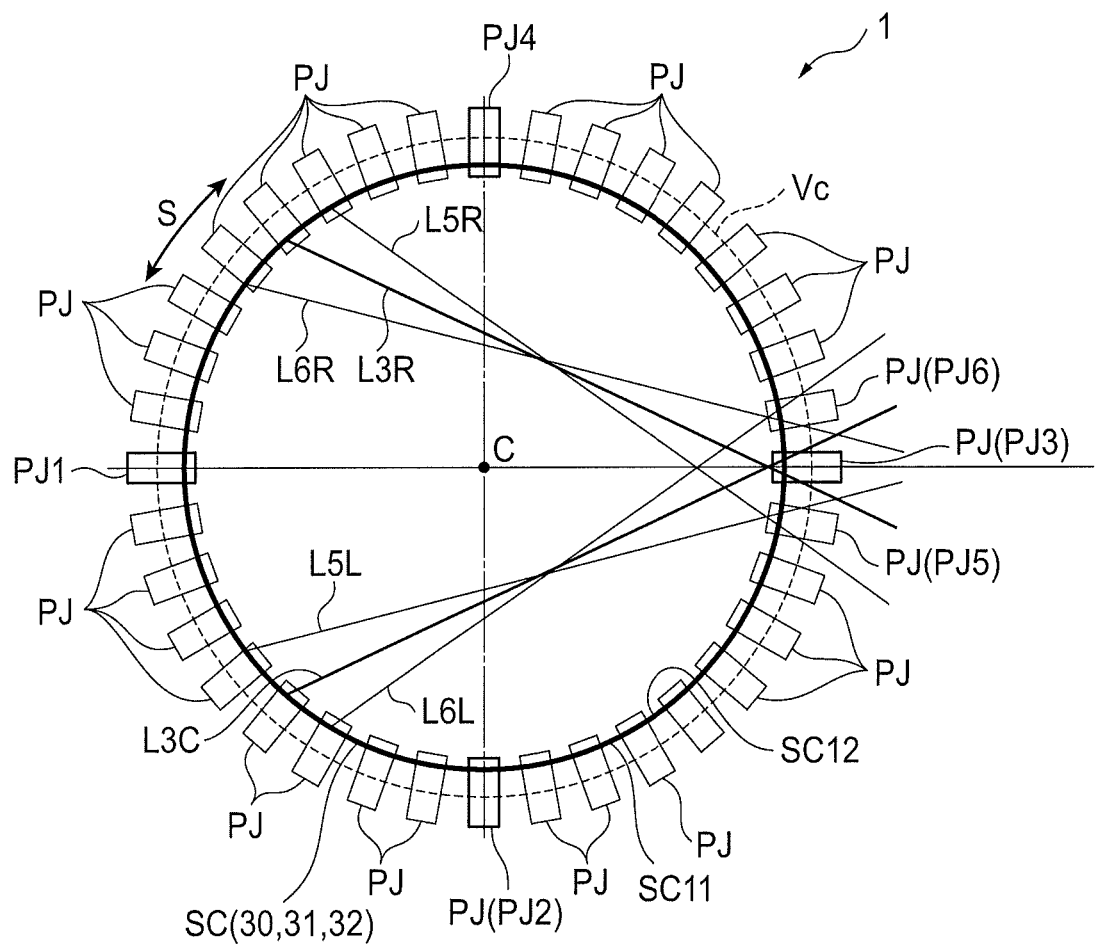
FIG. 2 is a diagram of a screen viewed from a direction along the center axis of the screen in the first embodiment.

FIG. 2 is a diagram of the screen SC1 viewed from the direction along the center axis C. Note that, in FIG. 2, a part of a plurality of projecting sections PJ included in the projection device 3 are omitted.

The screen SC1 is a reflection-type screen that reflects an image projected from the projection device 3 (the projecting sections PJ) described later. In this embodiment, the screen SC1 is formed in a cylindrical shape centering on the center axis C. The screen SC1 includes a substrate 30 (see FIG. 3), a retroreflective layer 31, and a transmissive diffusion layer 32.

The substrate 30 is formed in a substantially cylindrical shape by a light transmissive member. The retroreflective layer 31 is arranged on the outer circumference side of the substrate 30. The diffusion layer 32 is arranged on the inner circumference side of the substrate 30. That is, the diffusion layer 32 is located on the projection device 3 side (the inner circumference side) with respect to the retroreflective layer 31.

The retroreflective layer 31 configures an outer circumferential surface SC11 of the screen SC1 with a reflection surface of the retroreflective layer 31 directed to the center axis C side. The retroreflective layer 31 has a function of reflecting incident light to a direction opposite to an incident direction of the light. For example, as shown in FIG. 2, the recursive refection layer 31 reflects a beam L3R, which is projected from the projection device 3 (a projecting section PJ3), to a direction opposite to an incident direction of the beam L3R and reflects a beam L3L in a direction opposite to an incident direction of the beam L3L.

The retroreflective layer 31 is configured by a retroreflective material. For example, the retroreflective layer 31 has a configuration in which a plurality of micro glass beads are arranged on a base material via a reflection layer and a laminate layer is formed on the surfaces of the glass beads. With such a configuration, when light is made incident on the retroreflective layer 31 from the laminate layer side, the light passes through the glass beads and is reflected on the reflection layer to pass through the glass beads again and emitted in a direction opposite to an incident direction of the light on the retroreflective layer 31.

Note that a retroreflective material provided with a plurality of micro prisms instead of the glass beads may be adopted. The plurality of micro prisms may have a so-called corner reflector shape, three reflection surfaces of which are orthogonal to one another.

As explained above, the diffusion layer 32 is arranged on the inner side of the retroreflective layer 31 and configures an inner circumferential surface SC12 of the screen SC1. The diffusion layer 32 has a function of diffusing incident light wider in the direction T (the first direction) along the center axis C than in the circumferential direction S (the second direction) centering on the center axis C. In other words, the diffusion layer 32 diffuses light transmitted through the diffusion layer 32 wide in the direction T and diffuses the light narrow in the direction S.

Figure 3:
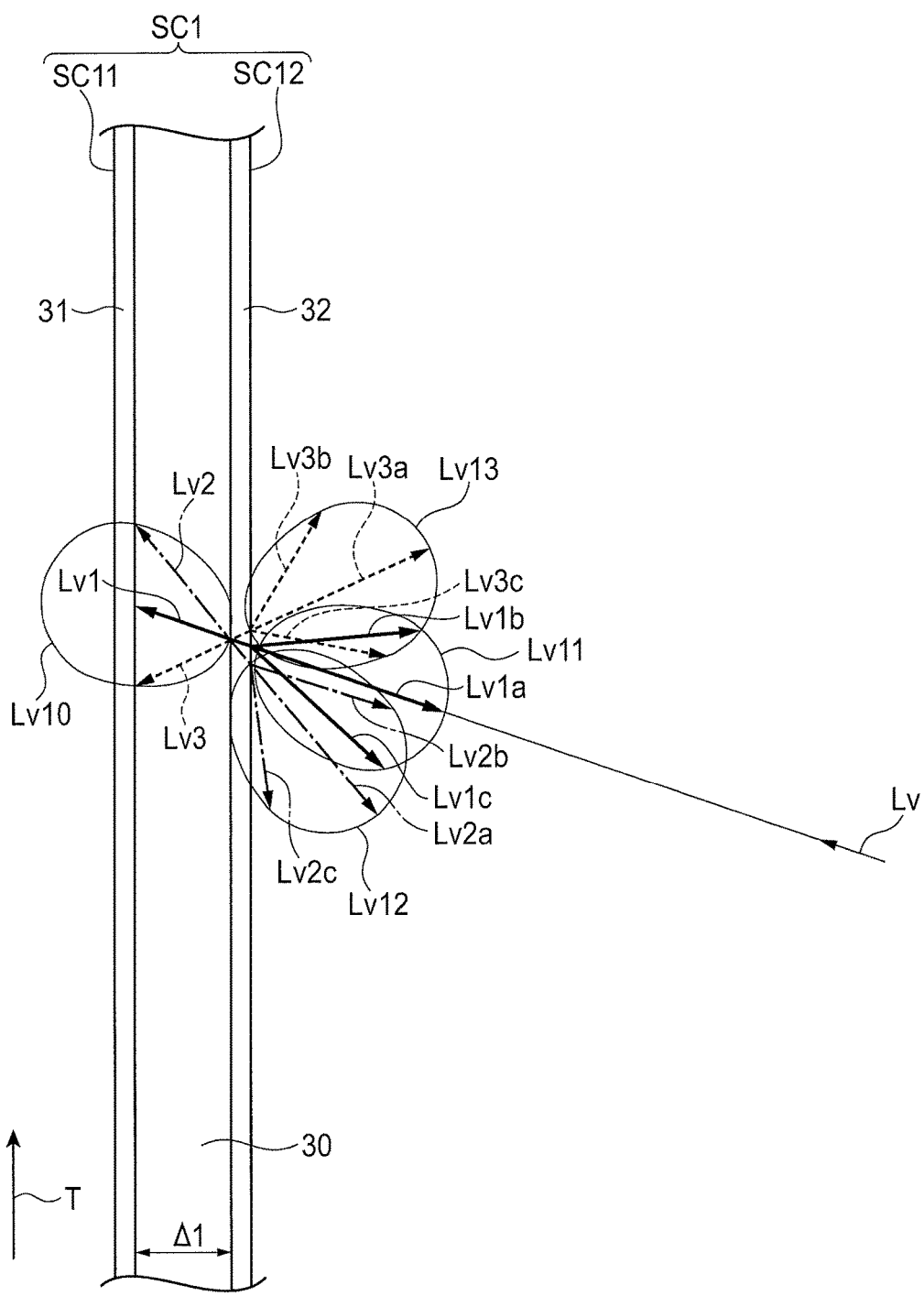
FIG. 3 is a sectional view of the screen in the direction along the center axis of the screen in the first embodiment.
Figure 4:
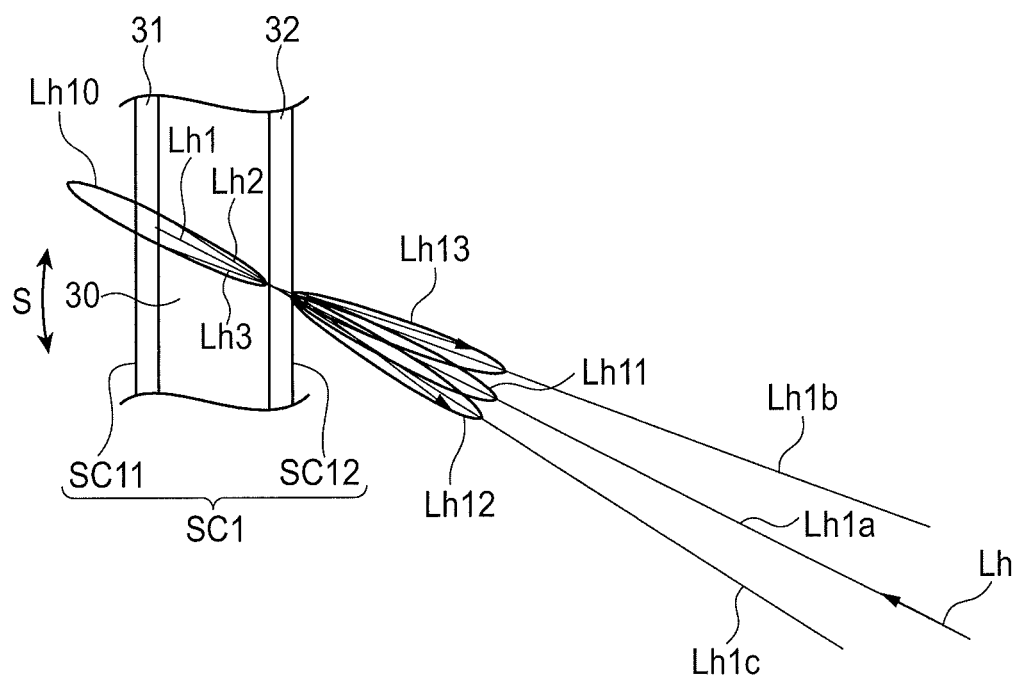
FIG. 4 is a sectional view of the screen in a direction orthogonal to the center axis of the screen in the first embodiment.

FIG. 3 is a schematic sectional view in the T direction showing a part of the screen SC1 in enlargement. FIG. 4 is a schematic sectional view in the S direction showing a part of the screen SC1 in enlargement. Note that, since the screen SC1 is formed in a cylindrical shape, actually, the screen SC1 is displayed in an arcuate shape. However, by enlarging a part of the screen SC1, the screen SC1 is approximately indicated by a straight line.

In this embodiment, as shown in FIG. 3, the diffusion layer 32 diffuses incident light at a diffusion angle equal to or larger than 40° and smaller than 60° in the direction T along the center axis C centering on a direction in which the incident light passes through the diffusion layer 32.

As shown in FIG. 4, the diffusion layer 32 diffuses incident light at a diffusion angle equal to or larger than 1° and smaller than 2° in the circumferential direction S centering on a direction in which the incident light passes through the diffusion layer 32.

The diffusion layer 32 is manufactured by, for example, transferring a mold having a micro surface structure generated by interference of a laser beam onto a resin substrate of polycarbonate, polyethylene, or the like applied with a photocuring agent and irradiating an ultraviolet ray on the resin substrate.

Reflection of Light Projected on the Screen

Reflection of light (a beam) made incident on the screen SC1 in the direction T (the first direction) along the center axis C is explained in detail below with reference to FIG. 3. Note that, in FIG. 3, diffused beams are represented by, for example, three beams. However, actually, the light changes to innumerable beams and diffuses.

For example, when a beam Lv made incident on the inner circumferential surface of the screen SC1 is made incident on the diffusion layer 32, as shown in FIG. 3, the beam Lv is diffused in the direction T along the center axis C at a wider angle (e.g., equal to or larger than 40° and smaller than 60°) by passing through the diffusion layer 32. Diffused incident light Lv10 is made incident on the retroreflective layer 31. The diffused incident light Lv10 is reflected by the retroreflective layer 31 in a direction substantially the same as an incident direction of the light made incident on the retroreflective layer 31 and is emitted toward the diffusion layer 32. Specifically, for example, when the beam Lv is made incident on the diffusion layer 32, a beam Lv1 emitted in a direction same as the direction of the beam Lv and beams Lv2 and Lv3 diffused in the T direction are made incident on the retroreflective layer 31. The beam Lv1, the beam Lv2, and the beam Lv3 are reflected by the retroreflective layer 31 in a direction substantially the same as the direction of the light made incident on the retroreflective layer 31 and are emitted toward the diffusion layer 32.

Consequently, the beam Lv1, the beam Lv2, and the beam Lv3, which are parts of beams emitted to the diffusion layer 32, are diffused in the T direction by the diffusion layer 32. That is, the beam Lv1 supplied to the diffusion layer 32 is diffused again by the diffusion layer 32 and changes to a diffused beam Lv11 including a beam Lv1a emitted in a direction same as the direction of the beam Lv1 and beams Lv1b and Lv1c diffused in the T direction. Similarly, the beam Lv2 supplied to the diffusion layer 32 is diffused by the diffusion layer 32 again and changes to a diffused beam Lv12 including a beam Lv2a emitted in a direction same as the direction of the beam Lv2 and beams Lv2b and Lv2c diffused in the T direction. Further, the beam Lv3 supplied to the diffusion layer 32 is diffused by the diffusion layer 32 again and changes to a diffused beam Lv13 including a beam Lv3a emitted in a direction same as the direction of the beam Lv3 and beams Lv3b and Lv3c diffused in the T direction.

In this way, the beam Lv is reflected while being diffused at an angle wider than a diffusion angle in the direction along the center axis C of the diffusion layer 32.

Reflection of light (a beam) made incident on the screen SC1 in the circumferential direction S is explained in detail below with reference to FIG. 4. Note that, in FIG. 4 as well, diffused beams are represented by, for example, three beams. However, actually, the light changes to innumerable beams and diffuses.

For example, when a beam Lh made incident on the inner circumferential surface of the screen SC1 is made incident on the diffusion layer 32, as shown in FIG. 4, the beam Lh is diffused in the circumferential direction S at a narrow angle (e.g., equal to or larger than 1° and smaller than 2°) by passing through the diffusion layer 32. Diffused incident light Lh10 is made incident on the retroreflective layer 31. The slightly diffused incident light Lh10 is reflected by the retroreflective layer 31 in a direction substantially the same as an incident direction of the light made incident on the retroreflective layer 31 and is emitted toward the diffusion layer 32. Specifically, for example, when the beam Lh is made incident on a diffusion sheet, a beam Lh1 emitted in a direction same as the direction of the beam Lh and beams Lh2 and Lh3 diffused in the circumferential direction S are made incident on the retroreflective layer 31. The beam Lh1, the beam Lh2, and the beam Lh3 are reflected by the retroreflective layer 31 in a direction substantially the same as the direction in which the beam Lh1, the beam Lh2, and the beam Lh3 are made incident on the retroreflective layer 31 and are emitted toward the diffusion layer 32.

Consequently, the beam Lh1, the beam Lh2, and the beam Lh3 emitted to the diffusion layer 32 are diffused in the circumferential direction S by the diffusion layer 32. That is, the beam Lh1 supplied to the diffusion layer 32 is slightly diffused again by the diffusion layer 32 and changes to a diffused beam Lh11 including a beam Lh1a emitted in a direction same as the direction of the beam Lh1 and a beam slightly diffused in the circumferential direction S. Similarly, the beam Lh2 supplied to the diffusion layer 32 is slightly diffused again by the diffusion layer 32 and changes to a diffused beam Lh12 including a beam Lh2a emitted in a direction same as the direction of the beam Lh2 and a beam diffused in the circumferential direction S. Further, the beam Lh3 supplied to the diffusion layer 32 is slightly diffused again by the diffusion layer 32 and changes to a diffused beam Lh13 including a beam Lh3a emitted in a direction same as the direction of the beam Lh3 and a beam diffused in the circumferential direction S.

That is, since a diffusion angle (e.g., equal to or larger than 1° and smaller than 2°) in the circumferential direction S (the second direction) is extremely narrow, the beam Lh made incident on the diffusion layer 32 is slightly diffused and reflected by the retroreflective layer 31.

Note that, as shown in FIGS. 3 and 4, the retroreflective layer 31 and the diffusion layer 32 are fixed while being arranged a proper space $\Delta 1$ apart from each other by the substrate 30. However, not only this, but the retroreflective layer 31 and the diffusion layer 32 may be closely attached to each other or may be arranged a space different from the space $\Delta 1$ apart from each other by, for example, changing a thickness dimension of the substrate 30.

Configuration of the Projection Device

The projection device 3 projects an image on the screen SC1. The projection device 3 includes the plurality of projecting sections PJ.

The plurality of projecting sections PJ are configured to be capable of respectively separately projecting images received from the display control device 5. As shown in FIG. 2, the projecting sections PJ are respectively arranged at an equal interval along an imaginary circle Vc centering on the center axis C and are fixed to the stand 6. Specifically, although not shown in the figure, the projecting sections PJ include light sources, light modulating devices that modulate lights emitted from the light sources, and projection optical devices that project the modulated lights (image lights). The respective projecting sections PJ are arranged such that pupil positions (exit pupil positions) of the projection optical devices are arranged on the imaginary circle Vc.

The plurality of projecting sections PJ project images corresponding to projecting directions of the respective projecting sections PJ. When it is assumed that an observation target stereoscopic image is located on the center axis C, the images are images including images of the observation target observed from positions (visual points) where the images projected from the respective projecting sections PJ are observed.

For example, according to the control by the display control device 5, the projecting section PJ3 projects, toward the outer circumferential surface SC11 of the screen SC1, an image including an image of the observation target observed from a visual point of an image projected from the projecting section PJ3. Consequently, when the eyes of the observer H are located at a visual point of the image projected by the projecting section PJ3 and reflected on the screen SC1 and observed, that is, a visual point located right above the projecting section PJ3, an image including an image of the observation target observed from the present positions of the eyes of the observer H is visually recognized by the observer H. The same applies when the eyes of the observer H are located in other positions.

Projection Width of Image Lights Projected from the Projecting Sections

The projecting sections PJ respectively project images having the same size (longitudinal dimension and width dimension) at the same angle of view (projection width).

For example, as shown in FIG. 2, the projecting section PJ3 projects an image within a range sandwiched between the beam L3L and the beam L3R. A projecting section PJ5 projects an image within a range sandwiched between a beam L5L and a beam L5R. Similarly, a projecting section PJ6 projects an image within a range sandwiched between a beam L6L and a beam L6R.

Track of Image Light Projected from the Projecting Section

Figure 5:
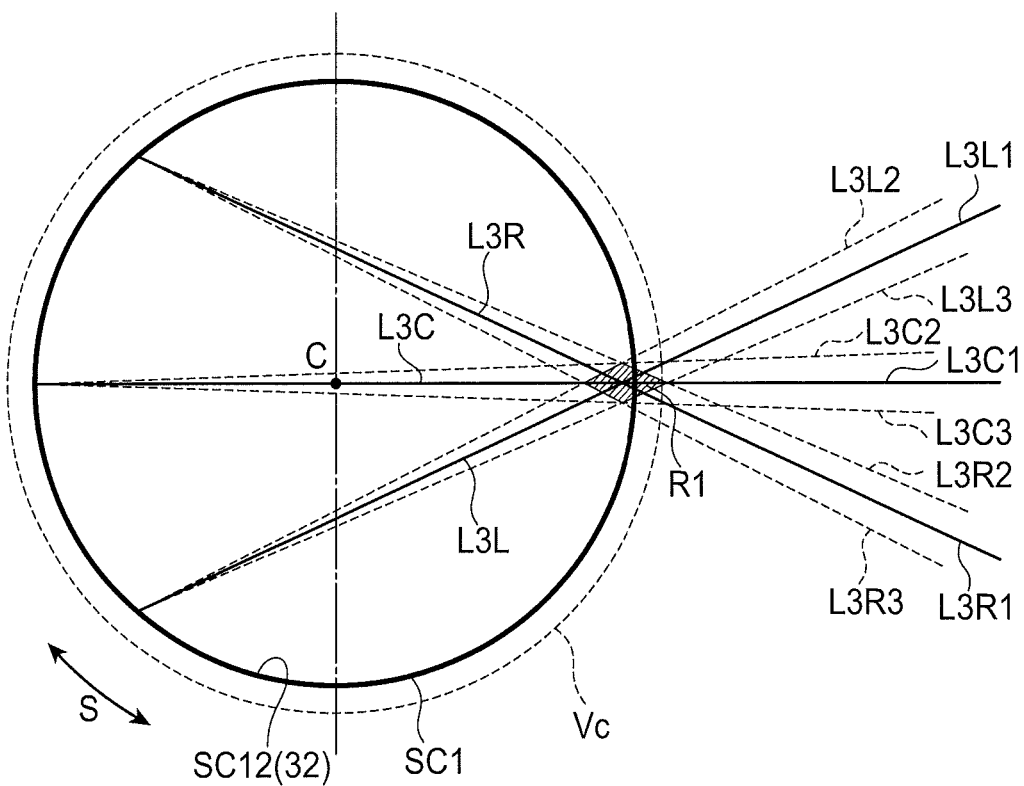
FIG. 5 is a diagram schematically showing a track of image light projected from a projecting section in the first embodiment.

FIG. 5 is a diagram schematically showing a track of light projected from the projecting section PJ3 shown in FIG. 2. Note that, in FIG. 5, the light projected from the projecting section PJ3 is schematically represented by three beams. However, actually, the light changes to innumerable beams and diffuses.

For example, in the image light projected from the projecting section PJ3, the beam L3L passing one end of the circumferential direction S is reflected and diffused in a direction opposite to an incident direction of the beam L3L by the screen SC1. An incident beam on the screen SC1 is diffused and emitted in the circumferential direction S by the diffusion layer 32. Therefore, the beam L3L made incident on the screen SC1 is diffused and emitted in a range centering on a beam L3L1, which travels in a direction opposite to the incident direction of the beam L3L on the screen SC1, and sandwiched between a beam L3L2 passing one end side of the circumferential direction S and a beam L3L3 passing the other end side.

Similarly, in the image light projected from the projecting section PJ3, a beam L3C passing the center of the circumferential direction S is diffused and emitted by the screen SC1 within a range centering on a beam L3C1, which travels in a direction opposite to an incident direction of the beam L3C on the screen SC1, and sandwiched between a beam L3C2 passing one end side of the circumferential direction S and a beam L3C3 passing the other end side.

In the image light projected from the projecting section PJ3, a beam L3R passing the other end of the circumferential direction S is diffused and emitted by the screen SC1 within a range centering on a beam L3R1, which travels in a direction opposite to an incident direction of the beam L3R on the screen SC1, and sandwiched between a beam L3R2 passing one end side of the circumferential direction S and a beam L3R3 passing the other end side.

The beams L3L1 to L3L3, L3C1 to L3C3, and L3R1 to L3R3 reflected in this way overlap one another in a position on an imaginary straight line passing a pupil position of the projecting section PJ3 and extending along the T direction, that is, an appropriate viewing range R1 indicated by hatching in FIG. 5. In the appropriate viewing range R1, substantially entire image light projected from the projecting section PJ3 toward the screen SC is collected. Therefore, if the observer H (the eyes of the observer H) is located in the appropriate viewing range R1, the observer H can visually recognize an image corresponding to image light projected from the projecting section PJ3.

Similarly, for example, when the observer H moves to an appropriate viewing range set in a position on an imaginary straight line passing a pupil position of the projecting section PJ5 and extending along the T direction, the observer H can visually recognize an image corresponding to image light projected from the projecting section PJ5 toward the screen SC1.

That is, by moving around the cylindrical screen SC1, the observer H can visually recognize an image corresponding to image light projected from the projecting section PJ corresponding to the position (the visual point) of the observer H.

As explained above, the light made incident on the screen SC1 is diffused wide in the direction T along the center axis C but is only slightly diffused in the circumferential direction S (the second direction). The screen SC1 includes the retroreflective layer. Therefore, as explained above, the image light reflected by the screen SC1 returns to the position on the imaginary straight line passing the pupil position of the not-shown projection optical device of the projecting section PJ and extending along the direction T. Consequently, even if different image lights are simultaneously projected from the respective plurality of projecting sections PJ, only an image projected from the projecting section PJ located right above the eyes of the observer H is selectively seen on an external circumferential surface SC11 of the screen SC1.

Example of an Observed Image

Figure 6:
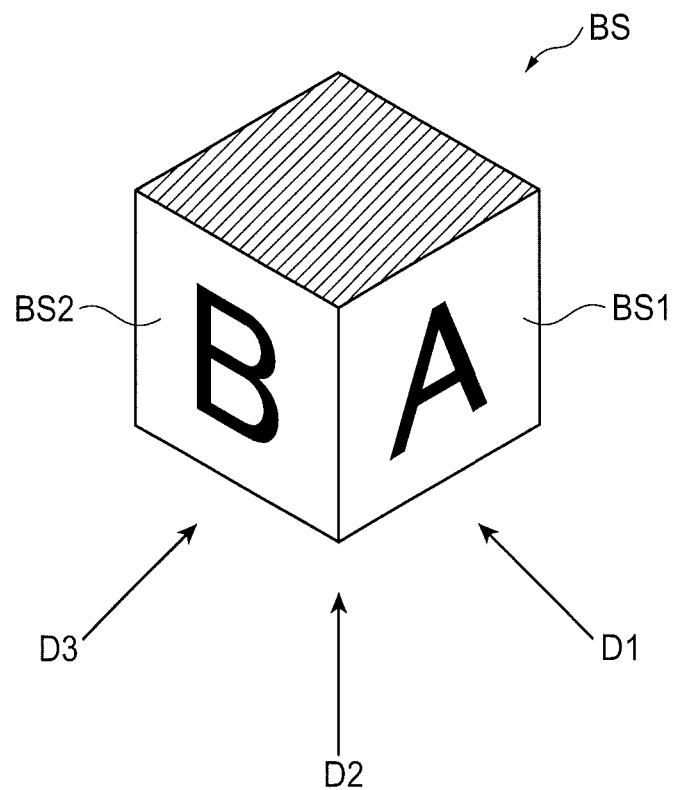
FIG. 6 is a diagram showing an observation target, which is an example of an observation target stereoscopic image, and observation directions of the observation target in the first embodiment.
Figure 7:
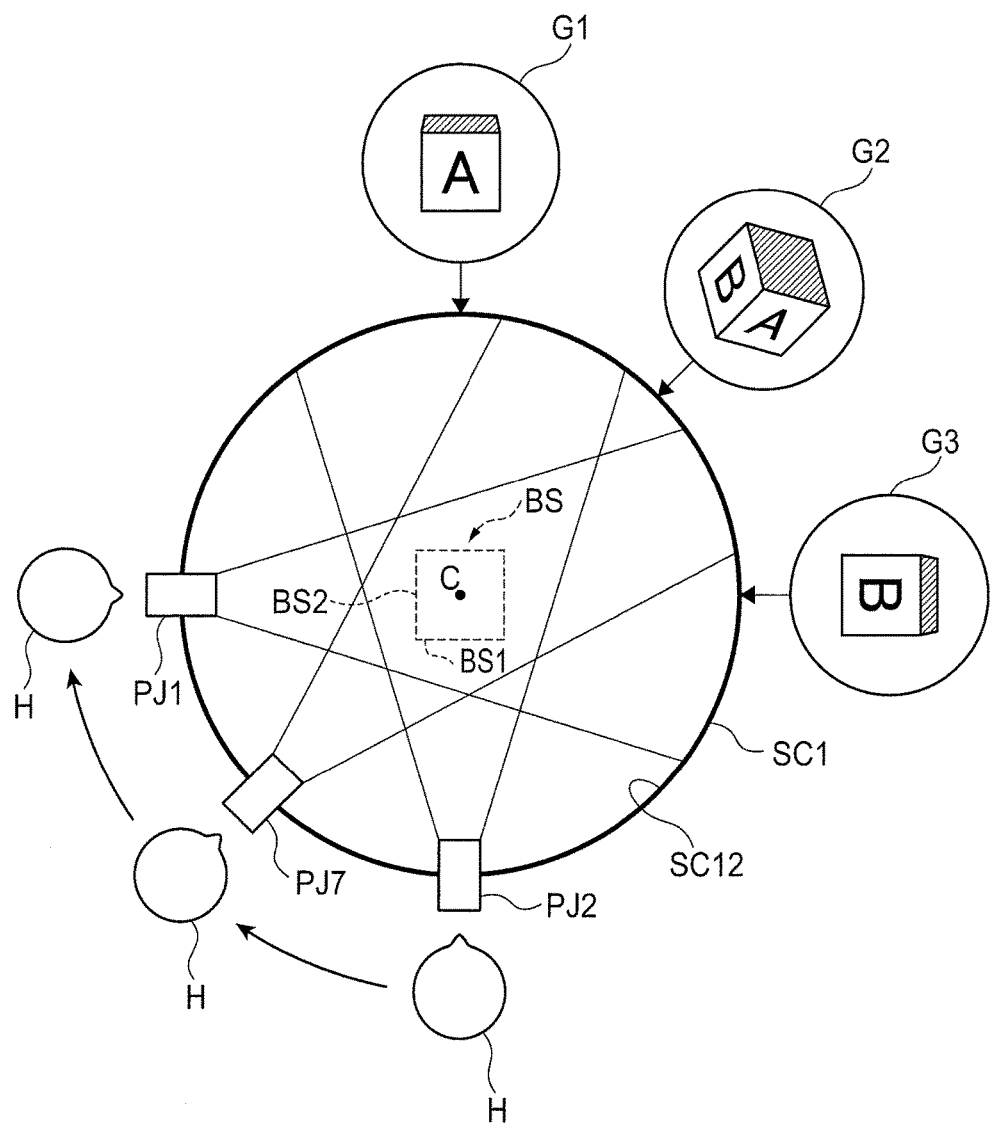
FIG. 7 is a diagram showing an example in which stereoscopic images that can be recognized are different according to the positions of an observer in the first embodiment.

FIG. 6 is a diagram showing an observation target BS, which is an example of an observation target stereoscopic image, and observation directions D1 to D3 of the observation target BS. FIG. 7 is a diagram showing an example of an image observed in the position of the observer H. Note that, in FIG. 7, to simplify illustration, only the projecting sections PJ necessary for explanation are shown. In FIG. 7, an arrangement state of the observation target BS not actually present is indicated by a dotted line.

When images projected on the screen SC1 from the plurality of projecting sections PJ are images of the observation target stereoscopic image BS shown in FIG. 6, the images projected from the projecting sections PJ are, for example, as shown in FIG. 7, images G1 to G3 including images of the observation target BS obtained when the observation target BS located on the center axis C is viewed from the appropriate viewing positions corresponding to the projecting sections PJ.

Specifically, when an image projected from the projecting section PJ2 is the image G1 of the observation target BS shown in FIG. 6 viewed from the direction D1, an image projected from a projecting section PJ7 in a position to which the observer H moves 45 degrees to one end side of the circumferential direction S from the projecting section PJ2 is the image G2 of the observation target BS viewed from the direction D2 to which the observer H moves in the same direction and at the same angle in the circumferential direction of the observation target BS with respect to the direction D1.

Among these images, the image G1 is an image of the observation target BS with a surface BS1, on which "A" is displayed, directed to the front. The image G2 is an image in a direction in which the surface BS1 in the observation target BS and a surface BS2, which crosses the surface BS1 and on which "B" is displayed, are observed.

Further, an image projected from a projecting section PJ1 in a position to which the observer H further moves 45 degrees to one end side of the circumferential direction S from the projecting section PJ7 (an image projected from the projecting section PJ1 in a position to which the observer H moves 90 degrees to one end side of the circumferential direction S from the projecting section PJ2) is the image G2 of the observation target BS viewed from the direction D3 to which the observer H moves in the same direction 45 degrees along the circumferential direction of the observation target BS with respect to the direction D2 (the direction D3 to which the observer H moves in the same direction 90 degrees along the circumferential direction of the observation target BS with respect to the direction D1). The image G3 is an image in which the surface BS2 in the observation target BS is directed to the front.

With such a configuration, when the observer H moves from the appropriate viewing position of the projecting section PJ2 to the appropriate viewing position of the projecting section PJ7, the observer H changes from a state in which the observer H can visually recognize the image G1 including the image of the observation target BS viewed along the direction D1 to a state in which the observer H can visually recognize the image G2 including the image of the observation target BS viewed along the direction D2. When the observer H moves from the appropriate viewing position of the projecting section PJ7 to the appropriate viewing position of the projecting section PJ1, the observer H changes from the state in which the observer H can visually recognize the image G2 to a state in which the observer H can visually recognize the image G3 including the image of the observation target BS viewed along the direction D3. That is, according to the movement of the observer H, the direction of the observation target included in the visually recognized image changes at any time. Therefore, the observer H can stereoscopically visually recognize the observation target BS.

Effects of the First Embodiment

The display apparatus 1 according to the first embodiment explained above has effects explained below.

An image projected on the inner circumferential surface SC12 of the screen SC1 from the projection device 3 (the projecting sections PJ) is reflected on the retroreflective layer 31 configuring the screen SC1 and is diffused by the diffusion layer 32. The diffusion layer 32 diffuses light wide in the first direction (the direction along the center axis C) and narrow in the second direction (the circumferential direction S). Therefore, the light reflected on the screen SC1 is collected at a visual, point (the appropriate viewing range R1) on a straight line extending along the first direction and passing a projection position of the image (a pupil position of the not-shown projection optical device) in the projection device. When the eyes of the observer are located at the visual point (the appropriate viewing range R1), the observer can visually recognize the image projected from the projection device 3.

The projection device 3 (the projecting sections PJ) projects, along projecting directions orthogonal to the center axis C of the screen SC1 and different from one another, images corresponding to the projecting directions on the inner circumferential surface SC12. Therefore, for example, when the projecting sections PJ respectively project images of the observation target, which are viewed from observation directions different from one another, along projecting directions corresponding to the observation directions, the observer H can visually recognize an image of the observation target observed from a direction corresponding to the position of the observer H. Therefore, the observer H can stereoscopically view the observation target through the motion parallax.

The projection device 3 (the projecting sections PJ) can project one image along the projecting directions. Therefore, as explained above, compared with the configuration for projecting partial images included in one image according to projecting directions, it is possible to improve the resolution of a projection image. Therefore, it is possible to clearly display an image that can be stereoscopically viewed.

Since the projection device 3 includes the plurality of projecting sections PJ, images of the observation target viewed from directions corresponding to the arrangement positions of the projecting sections PJ can be surely displayed on the inner circumferential surface SC12. Therefore, by changing the position of the observer H, the observer H can stereoscopically visually recognize the observation target included in respective projection images through the motion parallax.

The plurality of projecting sections PJ arranged on the imaginary circle Vc respectively project images. Therefore, even when there are a plurality of observers H, the observers H can visually recognize the images.

The plurality of projecting sections PJ are arranged on the lower end side in the T direction (the first direction) with respect to the screen SC1. Therefore, the projecting sections PJ can project image lights inclined with respect to the screen SC1. Consequently, the image lights reflected by the screen SC1 are reflected in the direction of the eyes of the observer H by the screen SC1. Therefore, the image lights can be surely made incident on the eyes of the observer H. The observer H can surely visually recognize an image.

Modification of the First Embodiment

Figure 8:
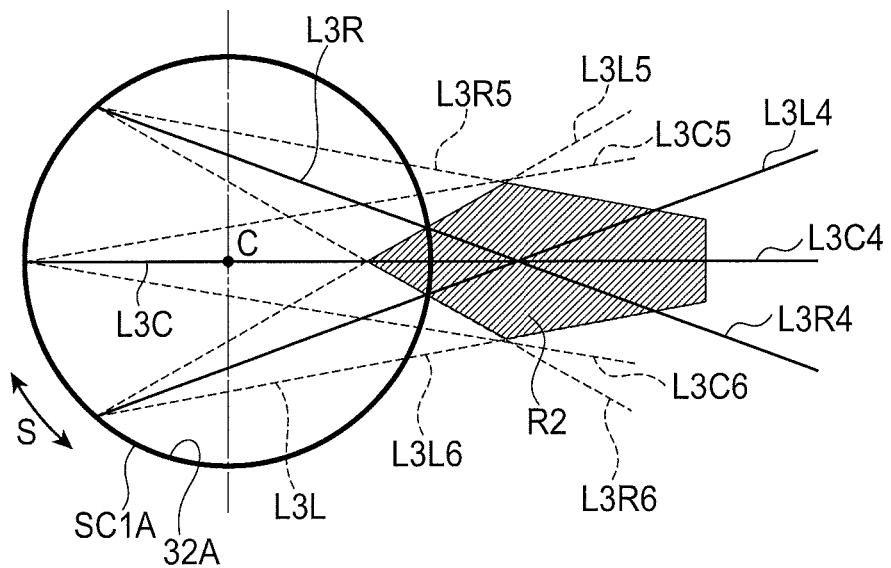
FIG. 8 is a plan view of the screen viewed from a direction along the center axis of the screen in a modification of the first embodiment.

FIG. 8 is a plan view of a screen SC1A viewed from the T direction. Note that, in FIG. 8, although twelve projecting sections PJ are originally arranged at an equal interval to surround the screen SC1A, for convenience of explanation, illustration of the projecting sections PJ is omitted. As in FIG. 5, light projected from the projecting section PJ3 is schematically represented by three beams. However, actually, the light changes to innumerable beams and diffuses.

For example, in the image light projected from the projecting section PJ3, the beam L3L passing one end of the circumferential direction S is reflected and diffused in a direction opposite to the incident direction of the beam L3L by the screen SC1A. The incident beam on the screen SC1A is diffused and emitted in the circumferential direction S by the diffusion layer 32. Therefore, the beam L3L made incident on the screen SC1A is diffused and emitted in a range centering on a beam L3L4, which travels in a direction opposite to the incident direction of the beam L3L on the screen SC1A, and sandwiched between a beam L3L5 passing one end side of the circumferential direction S and a beam L3L6 passing the other end side.

Similarly, in the image light projected from the projecting section PJ3, the beam L3C passing the center of the circumferential direction S is reflected and diffused by the screen SC1A in a range centering on a beam L3C4, which travels in a direction opposite to the incident direction of the beam L3C on the screen SC1A, and sandwiched between a beam L3C5 passing one end side of the circumferential direction S and a beam L3C6 passing the other end side.

In the image light projected from the projecting section PJ3, the beam L3R passing the other end of the circumferential direction S is reflected and diffused by the screen SC1A in a range centering on a beam L3R4, which travels in a direction opposite to the incident direction of the beam L3R on the screen SC1A, and sandwiched between a beam L3R5 passing one end side of the circumferential direction S and a beam L3R6 passing the other end side.

The beams L3L4 to L3L6, L3C4 to L3C6, and L3R9 to L3R6 reflected in this way overlap one another in a position on an imaginary straight line passing a pupil position of the projecting section PJ3 and extending along the T direction, that is, an appropriate viewing range R2 indicated by hatching in FIG. 8. In the appropriate viewing range R2, substantially entire image light projected from the projecting section PJ3 toward the screen SC1A is collected. Therefore, if the observer H (the eyes of the observer H) is located in the appropriate viewing range R2, the observer H can visually recognize an image corresponding to image light projected from the projecting section PJ3.

Figure 9:
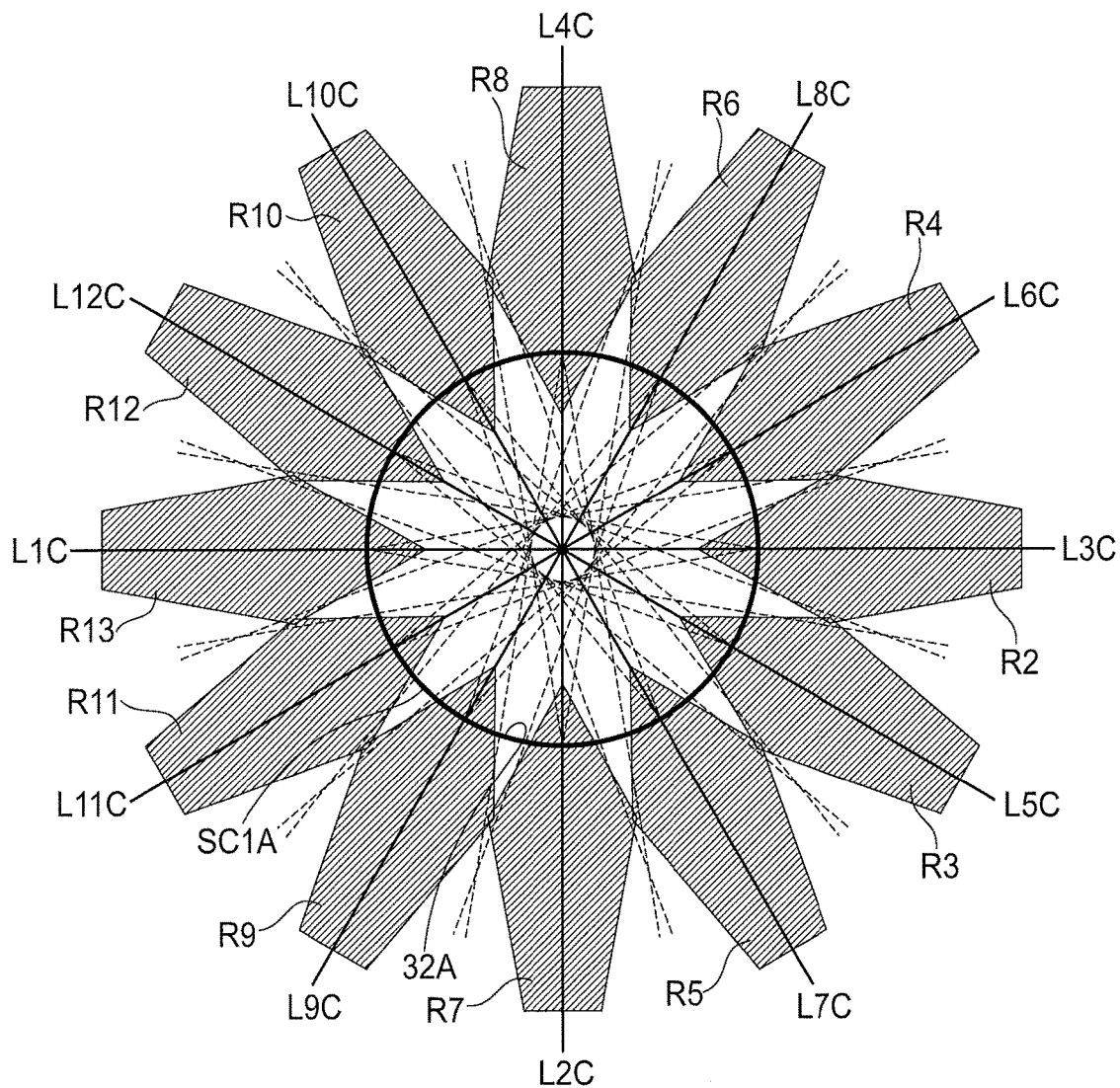
FIG. 9 is a diagram schematically showing tracks of image lights projected from projecting sections in the modification of the first embodiment.

FIG. 9 is a diagram schematically showing tracks of image lights projected from the twelve projecting sections PJ. Note that, in FIG. 9, only a beam in the center of image lights projected from the not-shown twelve projecting sections JP and appropriate viewing ranges, which are regions where images respectively projected from the not-shown projecting sections PJ can be accurately recognized, are shown.

When image lights are respectively projected from the not-shown twelve projecting sections PJ, the image lights are reflected by a diffusion layer 32A of the screen SC1A. As shown in FIG. 9, appropriate viewing ranges R2 to R13 centering on beams L1C to L12C in the center of the image lights are formed. All of the appropriate viewing ranges R2 to R13 are formed larger than the appropriate viewing range R1 in the first embodiment. That is, if the observer H (the eyes of the observer H) is located in the range of the appropriate viewing ranges R2 to R13, the observer H can recognize an image projected from the not-shown projecting section PJ arranged right below the observer H.

Effects of the Modification of the First Embodiment

In this modification, since the appropriate viewing ranges R2 to R13 are formed larger than the appropriate viewing range R1 in the first embodiment, the observer H can recognize an image projected on the screen SC1A in a wider range. Consequently, the observer H can recognize different images with the right eye and the left eye. For example, if the right eye is located in the appropriate viewing range R2 and the left eye is located in the appropriate viewing range R3, the observer H can recognize different images with both the eyes. The observer H can recognize a high-resolution clear stereoscopic image.

The appropriate viewing ranges R2 to R13 are formed larger than the appropriate viewing range R1 in the first embodiment. An image at one visual point (one appropriate viewing range) is generated by projection light projected from one projecting section PJ. Therefore, it is possible to reduce the number of the projecting sections PJ and attain a reduction in costs. Note that a diffusion angle may be appropriately set to prevent a gap from being formed among the appropriate viewing ranges R2 to R13. Even when a gap is formed, the observer H only has to move an observation position.

Further, as in the first embodiment, when the observer H moves around the cylindrical screen SC1A, the motion parallax occurs. Therefore, the observer H can recognize a clear stereoscopic image.

Second Embodiment

A display apparatus according to a second embodiment of the invention is explained.

A display apparatus 1A according to this embodiment has a configuration same as the configuration of the display apparatus 1. However, positions where a stand and the plurality of projecting sections PJ of the projection device 3 are provided are different from the positions in the first embodiment. Note that, in the following explanation, components the same as or substantially the same as the components explained above are denoted by the same reference numerals and signs and explanation of the components is omitted.

Figure 10:
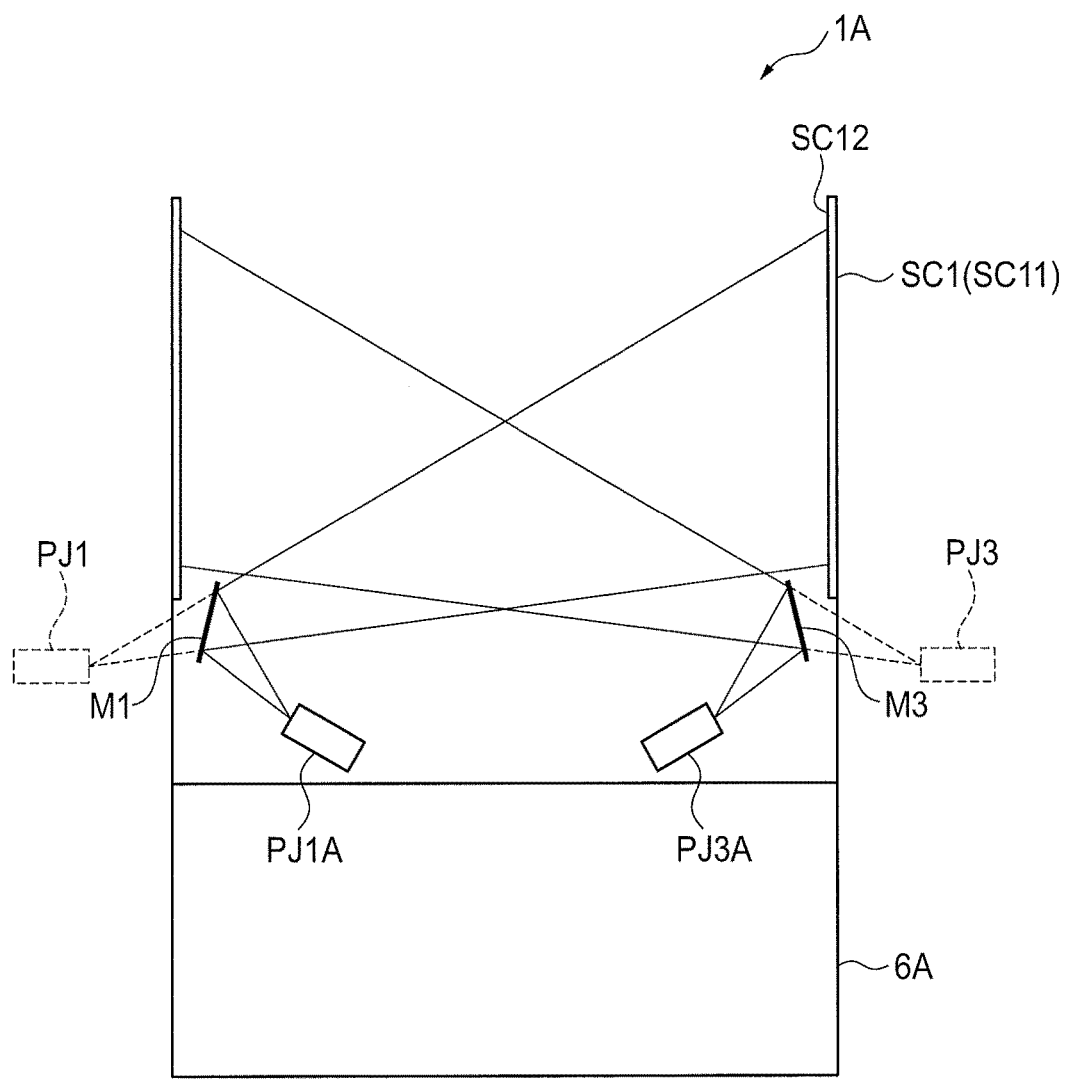
FIG. 10 is a sectional view of a screen in a direction along the center axis of the screen in a second embodiment of the invention.

FIG. 10 is a sectional view in a direction along the center axis C of the screen SC1 of the display apparatus 1A according to the second embodiment of the invention. Note that, in FIG. 10, positions where the projecting sections PJ1 and PJ3 of the projection device 3 in the first embodiment are arranged are indicated by broken lines.

The display apparatus 1A according to this embodiment has functions same as the functions of the display apparatus 1. Specifically, the display apparatus LA includes a stand 6A as shown in FIG. 10. The stand 6A is formed in a columnar shape having a radius substantially the same as the radius of the cylindrical screen SC1. At the upper end of the stand 6A, that is, the end on the T direction side, a plurality of reflection mirrors M equivalent to the plurality of projecting sections PJ and the reflection member according to the invention are arranged at a fixed interval in a circle centering on the center axis C and having a dimension same as the radius dimension of the screen SC1. The reflection mirrors M are provided on projection routes of image lights respectively projected from the plurality of projecting sections PJ. Note that, in FIG. 10, only projecting sections PJ1A and PJ3A and reflection mirrors M1 and M3 are shown taking into account clearness and the like of the drawing.

The plurality of projecting sections PJ1A and PJ3A include not-shown projection optical devices that project image lights. Projection lenses of the projecting sections PJ1A and PJ3A are arranged to face the inner circumferential surface SC12 of the screen SC1. The reflection mirrors M1 and M3 are provided in positions opposed to the not-shown projection optical devices of the projecting sections PJ1A and PJ3A. Consequently, when image light is projected on the reflection mirror M1 from the projection lens of the projecting section PJ1A, as shown in FIG. 10, the image light is reflected by the reflection mirror M1. The image light is projected in a position of the inner circumferential surface SC12 of the screen SC1 opposed to an emitting direction of the image light projected from the projection lens. Similarly, when image light is projected on the reflection mirror M3 from the projection lens of the projecting section PJ3A, as shown in FIG. 10, the image light is reflected by the reflection mirror M3. The image light is projected in a position of the inner circumferential surface SC12 opposed to an emitting direction of the image light. With such a configuration, the image lights projected from the projecting sections PJ1A and PJ3A are projected in a direction same as the direction of the image lights projected from the projecting sections PJ1 and PJ3 in the first embodiment indicated by the broken lines in FIG. 10.

Note that, in this embodiment, images formed by the image lights are reversed by the plurality of reflection mirrors M. Therefore, image lights for forming images reversed by the display control device 5 in advance are respectively projected from the plurality of projecting sections PJ.

Figure 11:
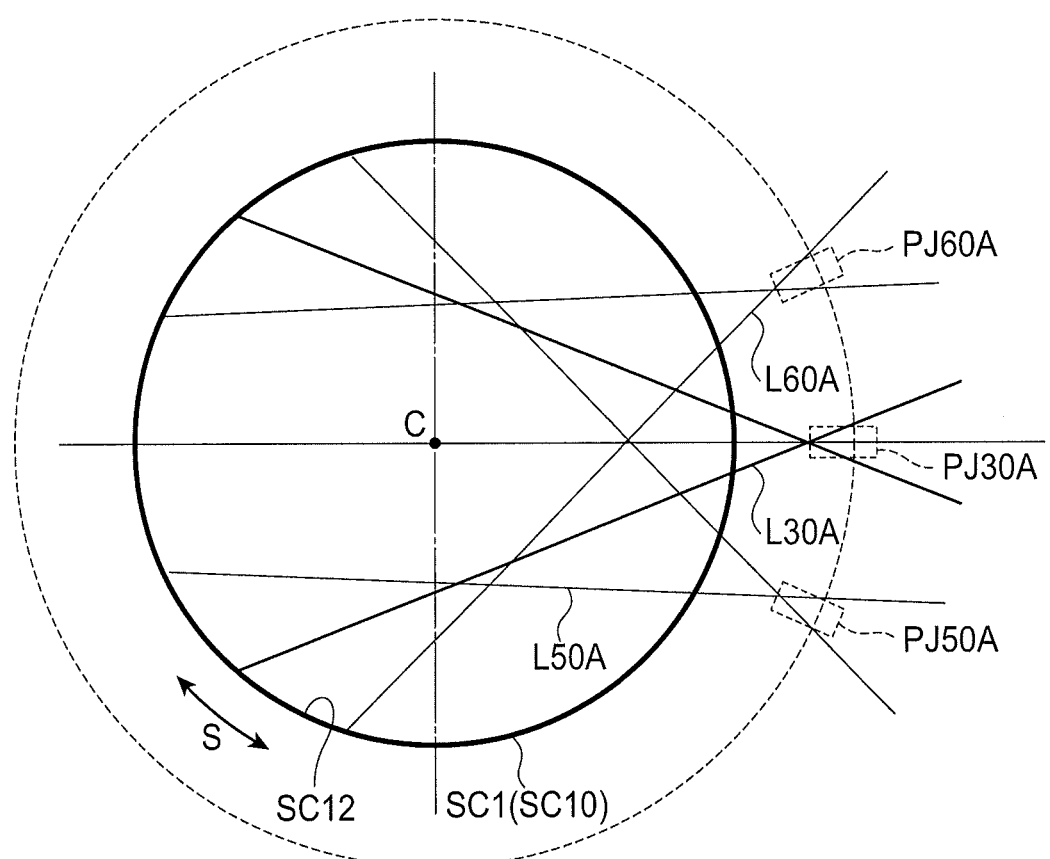
FIG. 11 is a plan view showing an imaginary position of a projection device in the case in which mirrors of a display apparatus are not provided in the second embodiment.

FIG. 11 is a plan view showing imaginary positions of the projecting sections PJ in the case in which the reflection mirrors M are not provided. Note that, in FIG. 11, the plurality of projecting sections PJ are originally arranged with the not-shown projection optical devices directed to the inner circumferential surfaces SC12 of the screen SC1 within the circumference of the screen SC1. However, for convenience of explanation, original projection positions are not shown. The positions of projecting sections PJ30A, PJ50A, and PJ60A at the time when a projection image same as the projection image in the embodiment is projected toward the screen SC1 if the reflection mirrors M are not provided are imaginarily indicated by broken lines.

For example, when the reflection mirror M3 of the projecting section PJ3A is not arranged, that is, in a state in which the reflection mirror M3 is not provided, to project an image same as the image projected from the projecting section PJ3A on the inner circumferential surface SC12 of the screen SC1, as shown in FIG. 11, it is necessary to provide the projecting section PJ3A in the position of the projecting section PJ30A. On the other hand, in this embodiment, since the reflection mirror M3 is provided, as shown in FIG. 10, the projecting section PJ3A can be set in a circle having a radius dimension same as the radius dimension of the screen SC1 at the upper end of the stand 6A.

Effects of the Second Embodiment

With the display apparatus 1A according to this embodiment, effects same as the effects of the display apparatus 1 according to the first embodiment are attained. Besides, effects explained below are attained.

In this embodiment, image lights projected from the projecting sections PJ are reflected toward projection positions corresponding to the image lights. Therefore, the projecting sections PJ and the reflection mirrors M can be arranged within a circle having a radius dimension same as the radius dimension of the screen SC1. Consequently, compared with when the projecting sections PJ are arranged on the outer circumferential surface SC11 side of the screen SC1, it is possible to reduce the display apparatus 1A in size.

Further, even when the observer H is a fixed distance apart from the screen SC1, the observer H can recognize an image based on the image lights projected from the plurality of projecting sections PJ. Therefore, the observer H can stereoscopically recognize the image in a wider range (e.g., a position away from the screen SC1) than in the first embodiment.

Third Embodiment

A display apparatus according to a third embodiment of the invention is explained.

A display apparatus 1B according to this embodiment has a configuration same as the configuration of the display apparatuses 1 and 1A. However, a screen and a stand are different. Besides, for example, arrangement positions of the projecting sections PJ are different from the arrangement positions in the display apparatuses 1 and 1A. Note that a screen SC2 is the same as the screen SC1 in that the screen SC2 is configured by the diffusion layer 32 and the retroreflective layer 31. However, the shape of the screen SC2 is different from the shape of the screen SC1. Note that, in the following explanation, components the same as or substantially the same as the components explained above are denoted by the same reference numerals and signs and explanation of the components is omitted.

Schematic Configuration of the Display Apparatus

Figure 12:
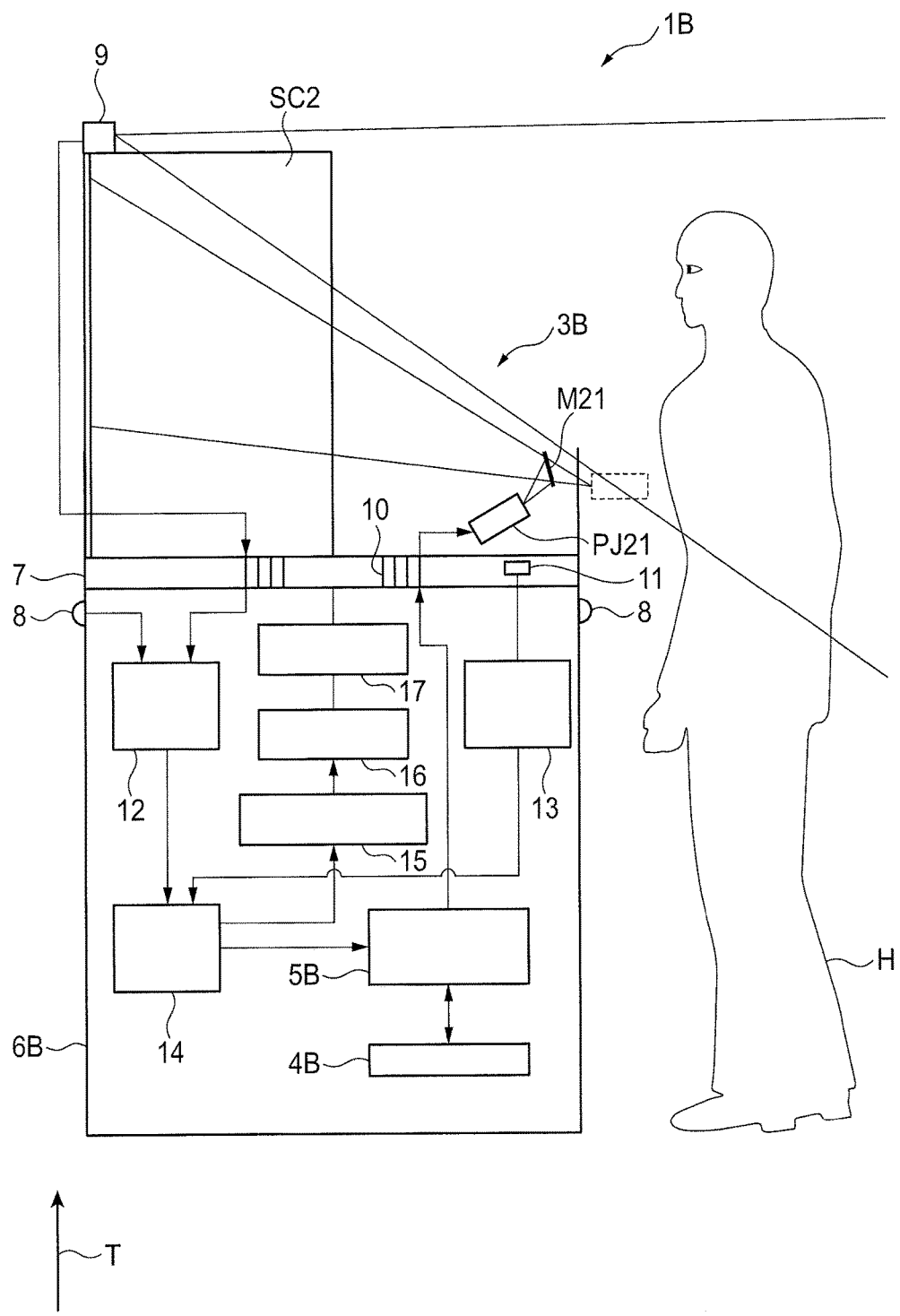
FIG. 12 is a schematic diagram showing the external view of a display apparatus according to a third embodiment of the invention.
Figure 13:
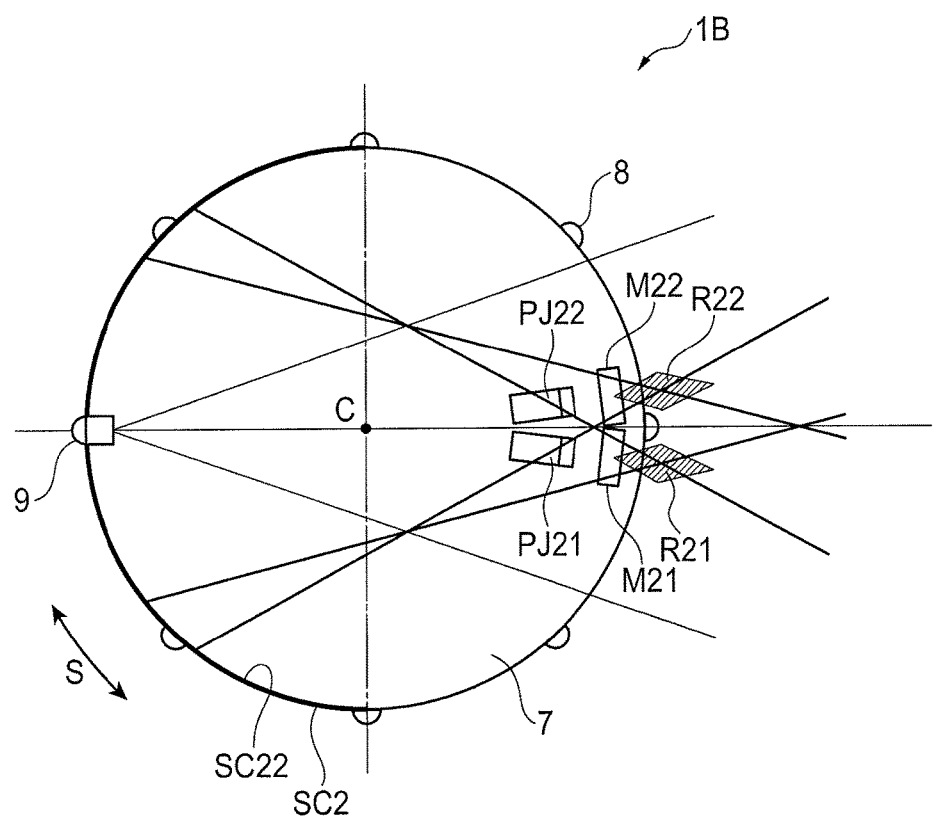
FIG. 13 is a diagram schematically showing tracks of image lights projected from projecting sections in the third embodiment.

FIG. 12 is a schematic diagram showing the display apparatus 1B according to the third embodiment. FIG. 13 is a diagram showing tracks of image lights projected from the projecting sections PJ according to the third embodiment.

The display apparatus 1B includes, as shown in FIGS. 12 and 13, the screen SC2, a projection device 3B, a storage device 4B, a display control device 5B, a stand 6B, a turning table 7, sensors 8, a camera 9, a turning electrode 10, an angle sensor 11, a direction detection circuit 12, an angle detection circuit 13, a direction control circuit 14, a driving circuit 15, a motor 16, and a reduction gear 17. When the screen SC2 and the projection device 3B (projecting sections PJ21 and PJ22) fixed to the turning table 7 detect the position of the observer H and turn and the projection device 3B projects image light of an observation target corresponding to the position of the observer H, the display apparatus 1B displays an image corresponding to the observer position and causes the observer to stereoscopically visually recognize the observation target through the binocular parallax and the motion parallax.

The stand 6B is a pedestal that supports the turning table 7 on which the screen SC2 and the projection device 3B (the projecting sections PJ21 and PJ22) are fixed. Besides, the storage device 4B, the display control device 5B, the sensors 8, the direction detection circuit 12, the angle detection circuit 13, the direction control circuit 14, the driving circuit 15, the motor 16, and the decelerator 17 are provided on the pedestal.

The turning table 7 includes the turning electrode 11 and the angle sensor 11. The camera 9 is attached to the upper end of the screen SC2.

As shown in FIG. 12, the stand 6B is formed in a columnar shape having a radius same as the radius of the screen SC2 having a semi-cylindrical shape and the tuning table 7.

The turning table 7 equivalent to the turning section according to the invention is attached to the upper end of the stand 6B. The turning table 7 is connected to the motor 16 and the reduction gear 17 provided in the stand 6B. The turning table 7 is provided to be turnable about the center axis C of the screen SC2 having the semi-cylindrical shape according to driving of the motor 16 and the reduction gear 17. The projecting sections PJ21 and PJ22, reflection mirrors M21 and M22, and the screen SC2 are fixed to the turning table 7 as explained above. Therefore, the projecting sections PJ21 and PJ22, the reflection mirrors M21 and M22, and the screen SC2 relatively turn integrally according to the turning of the turning table 7.

On the circumferential surface of the stand 6B, as shown in FIG. 13, a plurality of sensors 8 are attached at an equal interval. The sensors 8 have a function of detecting an approximate position of the observer H who observes the screen SC2. The sensors 8 are configured by, for example, ultrasound transmitting and receiving elements, infrared LEDs, and photosensors. The sensors 8 are electrically connected to the direction detection circuit 12.

The camera 9 has a function of taking an image of the observer H. As shown in FIG. 12, a specific image pickup range of the camera 9 is appropriately set in a range for covering the upper half of the body of the observer H located near the display apparatus 1B. The camera 9 is connected to the direction detection circuit 12 equivalent to the specifying section according to the invention. The direction detection circuit 12 has a function of detecting the position of the face, which is a specific part, of the observer H on the basis of a picked-up image taken by the camera 9. That is, the position detecting section according to the invention is configured by the sensors 8, the camera 9, and the direction detection circuit 12.

The turning electrode 10 is provided between the turning table 7 and the stand B. Video signals transmitted from the display control device 5B to the projecting sections PJ21 and PJ22, power supplies of the projecting sections PJ21 and PJ22, output signals transmitted from the camera 9 to the direction detection circuit 12, a power supply of the camera 9, and the like are connected via the turning electrode 10. Since the turning electrode 10 is provided, the turning table 7 is turnably supported by the stand 6B.

The angle sensor 11 is provided in the turning table 7 and has a function of detecting the direction of the turning table 7.

Configuration of the Screen

The screen SC2 is formed in a substantially semi-cylindrical shape. That is, the screen SC2 includes one side of the screen SC1 divided in the T direction. The screen SC2 has a configuration same as the configuration of the screen SC1 in the first embodiment except that the screen SC2 is placed on the turning table 7.

Reflection of Lights Projected on the Screen

As shown in FIG. 13, image lights respectively projected from the projecting sections PJ21 and PJ22 are reflected by the reflection mirrors M21 and M22 and projected on an inner circumferential surface SC22 of the screen SC2. Like the screen SC1 in the first embodiment, the screen SC2 is configured by the retroreflective layer 31 and the diffusion layer 32. Therefore, the image lights are reflected while being slightly diffused in the circumferential direction S. Consequently, appropriate viewing ranges R21 and R22 are formed.

Configuration of the Projection Device

The projection device 3B includes the projecting sections PJ21 and PJ22. As shown in FIG. 13, the projecting sections PJ21 and PJ22 are placed in a direction opposed to the inner circumferential surface SC22 of the screen SC2, that is, at the upper end of the turning table 7. The projecting sections PJ21 and PJ22 are arranged while being arranged at a fixed space such that not-shown projection optical devices face a direction opposed to the inner circumferential surface SC22. More specifically, the interval between the projecting section PJ21 and the projecting section PJ22 (more specifically, the interval between the optical axis of the not-shown projection optical device of the projecting section PJ21 and the optical axis of the not-shown projection optical device of the projecting section PJ22) is set to approximately 65 mm, which is the eye interval of the standard person (the observer H). The reflection mirrors M21 and M22 are provided on projection routes of image lights respectively projected from the projecting sections PJ21 and PJ22. The projecting sections PJ21 and PJ22 and the reflection mirrors M21 and M22 are arranged in the imaginary circle Vc having a radius diameter same as the radius diameter of the screen SC2 having the semi-cylindrical shape.

Circuit Configuration of the Display Apparatus

The stand 6B includes, as shown in FIG. 12, the display control device 5B, the storage device 4B, the direction detection circuit 12, the angle detection circuit 13, the direction control circuit 14, the driving circuit 15, the motor 16, and the reduction gear 17.

In the storage device 4B, for example, a plurality of kinds of image information of one solid object visually recognized from different directions are stored.

The display control device 5B is equivalent to the control section according to the invention. The display control device 5B converts the plurality of kinds of image information stored in the storage device 4B into image signals and transmits different image signals respectively to the projecting sections PJ21 and PJ22. The display control device 5B has a function of controlling the plurality of projecting sections PJ21 and PJ22 to display, on an inner circumferential surface C22 of the screen SC2, different images for each turned position of the turning table 7.

The direction detection circuit 12 is equivalent to the specifying section according to the invention. The direction detection circuit 12 specifies an approximate position of the observer H and the position of the face of the observer H from images detected by the sensors 8 and the camera 9 and outputs the positions to the direction control circuit 14 as a detection result.

The angle detection circuit 13 outputs the direction of the turning table 7 detected by the angle sensor 11 to the direction control circuit 14 as a detection result.

The direction control circuit 14 outputs the detection result, which is output from the direction detection circuit 12, to the display control device 5B. The direction control circuit 14 outputs the detection result, which is output from the direction detection circuit 12, and the detection result, which is output from the angle detection circuit 13, to the driving circuit 15. That is, a positional relation between the present direction of the turning table 7 and the observer H is output to the driving circuit 15.

The driving circuit 15 is equivalent to the turning control section according to the invention. The driving circuit 15 drives the motor 16 on the basis of the detection result output from the direction control circuit 14. The motor 16 is configured by, for example, a pulse motor that rotates a predetermined angle in proportion to the number of pulses. The reduction gear 17 is connected to a rotating shaft of the motor 16. The reduction gear 17 has a function of reducing the rotating speed of the power of the motor 16 with a gear or the like and outputting the rotating speed. Since the reduction gear 17 is connected to the turning table 7, the turning table 7 turns with the power of the motor 16.

Note that, in the display control device 5B, the direction detection circuit 12, the angle detection circuit 13, the direction control circuit 14, and the driving circuit 15, CPUs, ROMs that store computer programs, and RAMs that execute calculation, which are not shown in the figure, are respectively provided. The various kinds of processing explained above are executed on the basis of the computer programs stored in the ROMs in advance.

Display Control Processing

Figure 14:
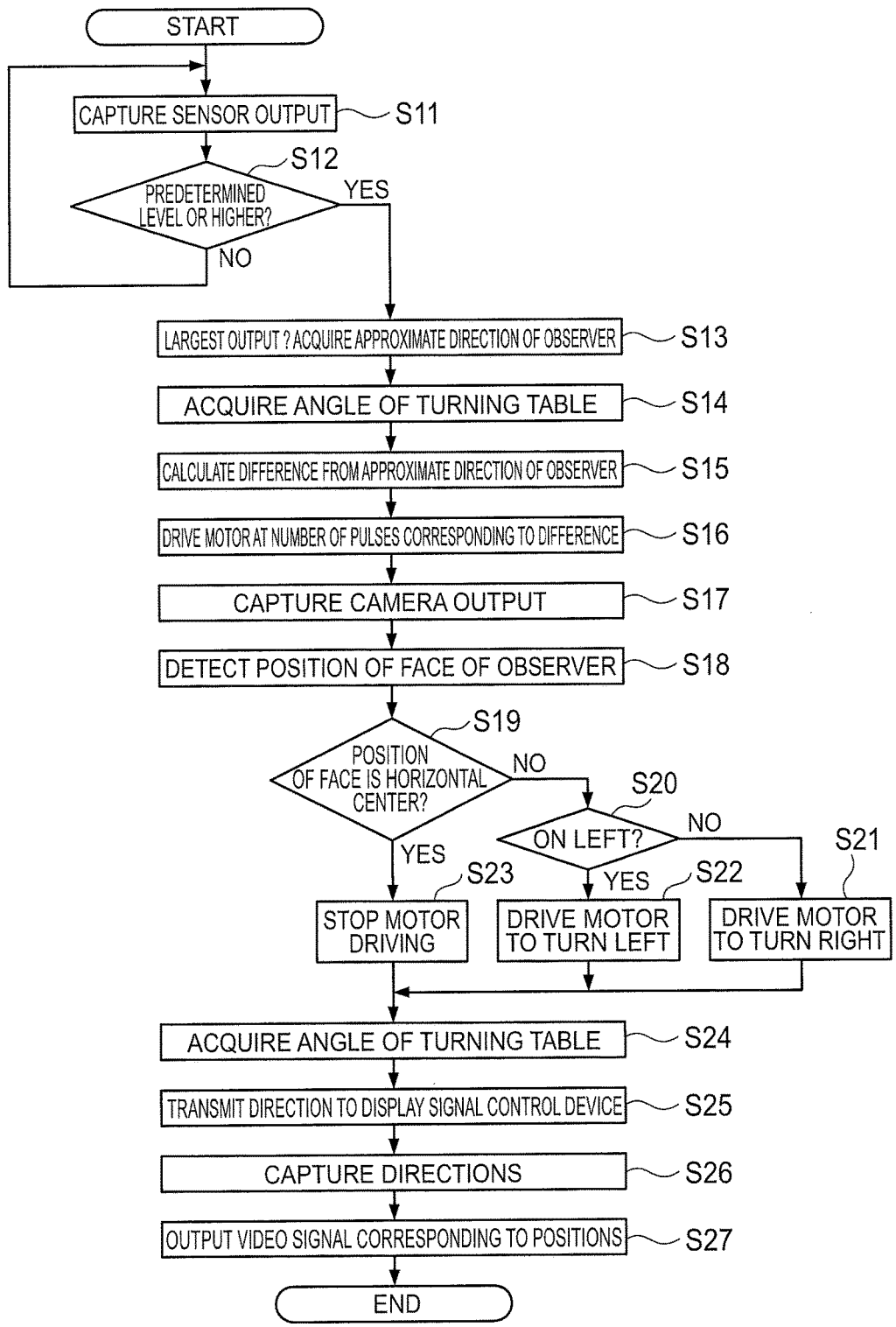
FIG. 14 is a flowchart for explaining a display control processing procedure of the display apparatus in the third embodiment.

FIG. 14 is a flowchart for explaining a display control processing procedure in the display apparatus 1B.

First, when electric power is supplied to the display apparatus 1B, the sensors 8 are driven. The direction detection circuit 12 captures outputs (detection results) of the sensors 8 (step S11). The direction detection circuit 12 determines whether the sensor outputs are equal to or higher than a predetermined level set in advance (step S12). When determining that the sensor output is not equal to or higher than the predetermined level (NO in step 312), the direction detection circuit 12 repeats steps S11 and S12. On the other hand, when determining that the sensor output is equal to or higher than the predetermined level (YES in step S12), the direction detection circuit 12 determines that the observer H is present near the display apparatus 1B. When determining in step S12 that outputs of the plurality of sensors 8 are equal to or higher than the predetermined level, the direction detection circuit 12 acquires, as an approximate position (an approximate direction) of the observer H, a direction in which the sensor 8 having the largest sensor output is provided. The direction detection circuit 12 outputs the acquired result (a detection result) to the direction control circuit 14 (step S13).

On the other hand, the angle detection circuit 13 outputs a direction (an angle) of the turning table 7 detected by the angle sensor 11 to the direction control circuit 14 as a detection result (step S14). The direction control circuit 14 calculates, from the detection results acquired in step S13 and step S14, a difference between the direction of the turning table 7 and the direction in which the observer H is located (step S15). When the difference calculated in this way is output to the driving circuit 15, the driving circuit 15 drives the motor 36 at the number of pulses corresponding to the difference (step S16). In this way, the screen SC2 is moved in a direction opposed to the observer H.

In this state, the camera 9 is driven. An image taken by the camera 9 is output to the direction detection circuit 12 (step S17). Note that, according to the processing in steps S11 to S16, since the observer H is located in the position substantially opposed to the screen SC2, the face, which is the specific part, of the observer H is displayed in a recognizable state on the image picked up by the camera 9. The direction detection circuit 12 detects the position of the face of the observer H from the image taken by the camera 9 and outputs the position to the direction control circuit 14 (step S18). The direction control circuit 14 determines whether the position of the face of the observer H is present in the center in the circumferential direction S (the horizontal direction) of an image pickup range (step S19). When determining that the position of the face of the observer H is absent in the center in the circumferential direction S of the image pickup range (NO in step S19), the direction control circuit 14 determines whether the position of the face is located on the left of the image pickup range (step S20). When determining that the position of the face is not on the left (is on the right) (NO in step S20), the direction control circuit 14 calculates a turning distance of the turning table 7 in order to locate the position of the face in the center and outputs the calculated turning distance to the driving circuit 15 as a signal. The driving circuit 15 drives the motor 16 on the basis of the calculated turning distance and moves the turning table 7 in the right direction of the circumferential direction S (i.e., a direction in which the observer H is located with respect to the center of the circumferential direction S in the picked-up image of the camera 9 (step S21).

On the other hand, when determining in step S20 that the position of the face of the observer H is on the left (YES in step S20), the direction control circuit 14 calculates a turning distance of the turning table 7 in order to locate the position of the face in the center and outputs the calculated turning distance to the driving circuit 15 as a signal. The driving circuit 15 drives the motor 16 on the basis of the calculated turning distance and moves the turning table 7 in the left direction of the circumferential direction S (i.e., a direction in which the observer H is located with respect to the center of the circumferential direction S in the picked-up image of the camera 9) (step S22). On the other hand, when determining in step S19 that the face of the observer H is present in the center position in the circumferential direction S of the image pickup range (YES in step S19), the direction control circuit 14 outputs a signal for stopping the driving of the motor 16 to the driving circuit 15. The driving circuit 15 stops the motor 16 and the reduction gear 17 (step S23).

After the processing in the steps 321, 322, and S23 is executed, the angle detection circuit 13 acquires the direction (the angle) of the turning table 7 detected by the angle sensor 11 and outputs the direction (the angle) to the direction control circuit 14 (step S24). The direction control circuit 14 transmits (outputs) the direction of the turning table 7, which is acquired from the angle detection circuit 13, to the display control device 5B (step S25).

The display control device 5B captures, on the basis of the transmitted direction (angle) of the turning table 7, the direction of the screen SC2, that is, the directions (the positions) of the projecting sections PJ21 and PJ22 (step S26). The display control device 5B acquires a video signal corresponding to the positions of the projecting sections PJ21 and PJ22 from the storage device 4B and causes the projecting sections PJ21 and PJ22 to output image lights based on the video signal (step S27). That is, the display control device 5B detects the positions of the projecting sections PJ21 and PJ22 from the direction (the angle) of the turning table 7 and causes the projecting sections PJ21 and PJ22 to project different images to the screen SC2 for each of the positions of the projecting sections PJ21 and PJ22. Consequently, when the observer B moves around the display apparatus 1B, when the inner circumferential surface SC22 of the screen SC2 is viewed from each of a plurality of visual points, different images are respectively projected on the inner circumferential surface SC22. The right eye of the observer H is located in the appropriate viewing range R21 and the left eye of the observer H is located in the appropriate viewing range R22. The observer H can recognize an image projected on the screen SC2 as a stereoscopic image through the binocular parallax of the eyes.

Effects of the Third Embodiment

With the display apparatus B1 according to the third embodiment, effects same as the effects of the display apparatuses 1 and 1A according to the embodiments explained above are attained. Besides, effects explained below are attained.

In this embodiment, the projection device 3B (the projecting sections PJ21 and PJ22) and the screen SC2 are rotated to enable the observer H to observe an image projected by the projection device 3B (the projecting sections PJ21 and PJ22) in the position of the observer H detected by the direction detection circuit 12 on the basis of the detection results of the sensors 8 and the camera 9. The projection device 3B (the projecting sections PJ21 and PJ22) projects an image corresponding to the position of the observer H, that is, an image corresponding to a direction in which the position of the observer H faces the observation target. Consequently, the turning table 7 turns the projection device 3B (the projecting sections PJ21 and PJ22) and the screen SC2 to follow the movement of the observer H. The projection device 3B (the projecting sections PJ21 and PJ22) projects an image corresponding to the position of the observer H. Therefore, the observer H can stereoscopically visually recognize the observation target included in the projection image through the motion parallax.

The camera 9 picks up an image of the observer H detected by the sensors 8. For example, the camera 9 turns according to the turning of the turning table 7. Therefore, by providing only one camera more expensive than the sensors 8, it is possible to take an image of the face, which is the predetermined part, of the observer H. The direction detection circuit 12 can specify the position of the face of the observer H. Consequently, since the number of cameras 9 can be reduced, it is possible to reduce manufacturing costs of the display apparatus 1B. Since the projection device 3B (the projecting sections PJ21 and PJ22) projects an image corresponding to the position of the face of the observer H, the observer can recognize a clearer stereoscopic image.

Further, the arrangement interval of the projecting sections PJ21 and PJ22 adjacent to each other is set to approximately 65 mm. Therefore, an image projected from the projecting section PJ22, which is one of the projecting sections adjacent to each other, is reflected by a screen SC2 and observed by the right eye of the observer H. An image projected from the projecting section PJ21, which is the other of the projecting sections adjacent to each other, is reflected by the screen SC2 and observed by the left eye of the observer H. Consequently, by observing the projection images by the projecting sections PJ as parallax images, the observer H can stereoscopically visually recognize the observation target included in the respective projection images through the binocular parallax.

Modification of the Third Embodiment

In the third embodiment, the display apparatus 1B includes the projecting sections PJ21 and PJ22. However, the invention is not limited to this. For example, the display apparatus 1B may include only a projecting section PJ20 instead of the projecting sections PJ21 and PJ22.

Figure 15:
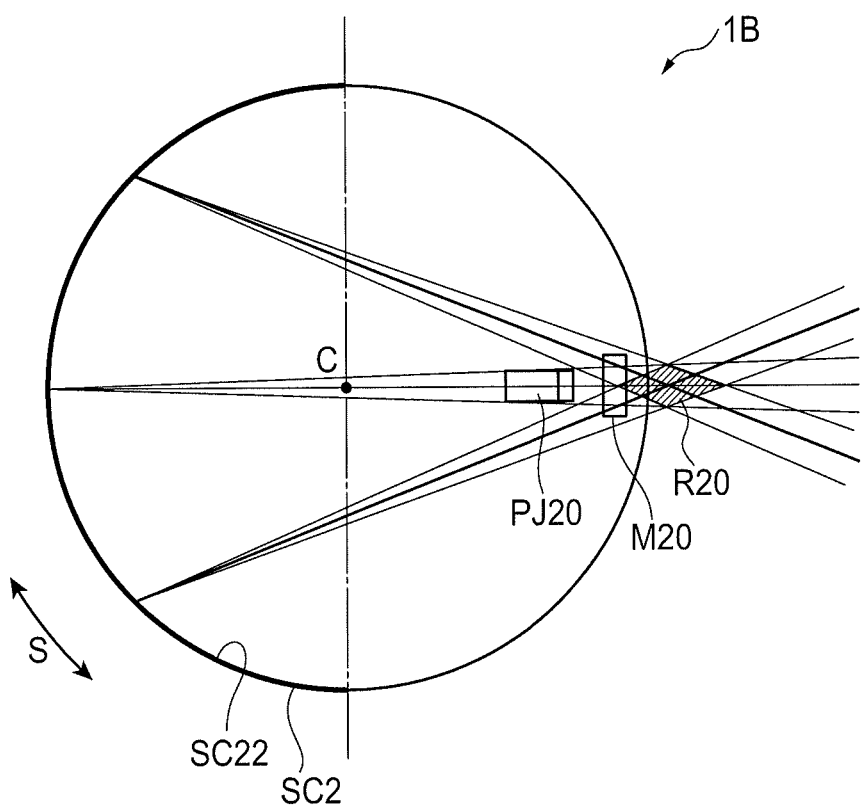
FIG. 15 is a diagram schematically showing a track of image light projected from a projecting section in a modification of the third embodiment.

FIG. 15 is a diagram schematically showing a track of image light projected from the projecting section PJ20.

The projecting section PJ20 is placed in a direction opposed to the inner circumferential surface SC22 of the screen SC2 at the upper end of the turning table 7. A reflection mirror M20 is provided on a projection route of image light projected from the projecting section PJ20. Consequently, as shown in FIG. 15, the image light projected from the projection section PJ20 is reflected by the reflection mirror M20 and projected on the inner circumferential surface SC22 of the screen SC2. The image light is reflected by the screen SC2 while being slightly diffused in the circumferential direction S. Consequently, an appropriate viewing range R20 is formed.

Effects of the Modification of the Third Embodiment

According to this modification, since only the projecting section PJ20 is provided, compared with when the plurality of projecting sections PJ are provided, it is possible to reduce manufacturing costs. When the image light is projected on the screen SC2 from the projecting section PJ20, an image is projected while being slightly diffused in the circumferential direction S and the appropriate viewing range R20 is formed. Therefore, the binocular parallax caused when both the eyes respectively recognize different images could not occur. However, the motion parallax occurs according to the movement of the observer H. Therefore, only with the projecting section PJ20, the observer H can stereoscopically recognize the projected image.

Forth Embodiment

A fourth embodiment of the invention is explained below with reference to the drawings.

Schematic Configuration of a Display Apparatus

Figure 16:
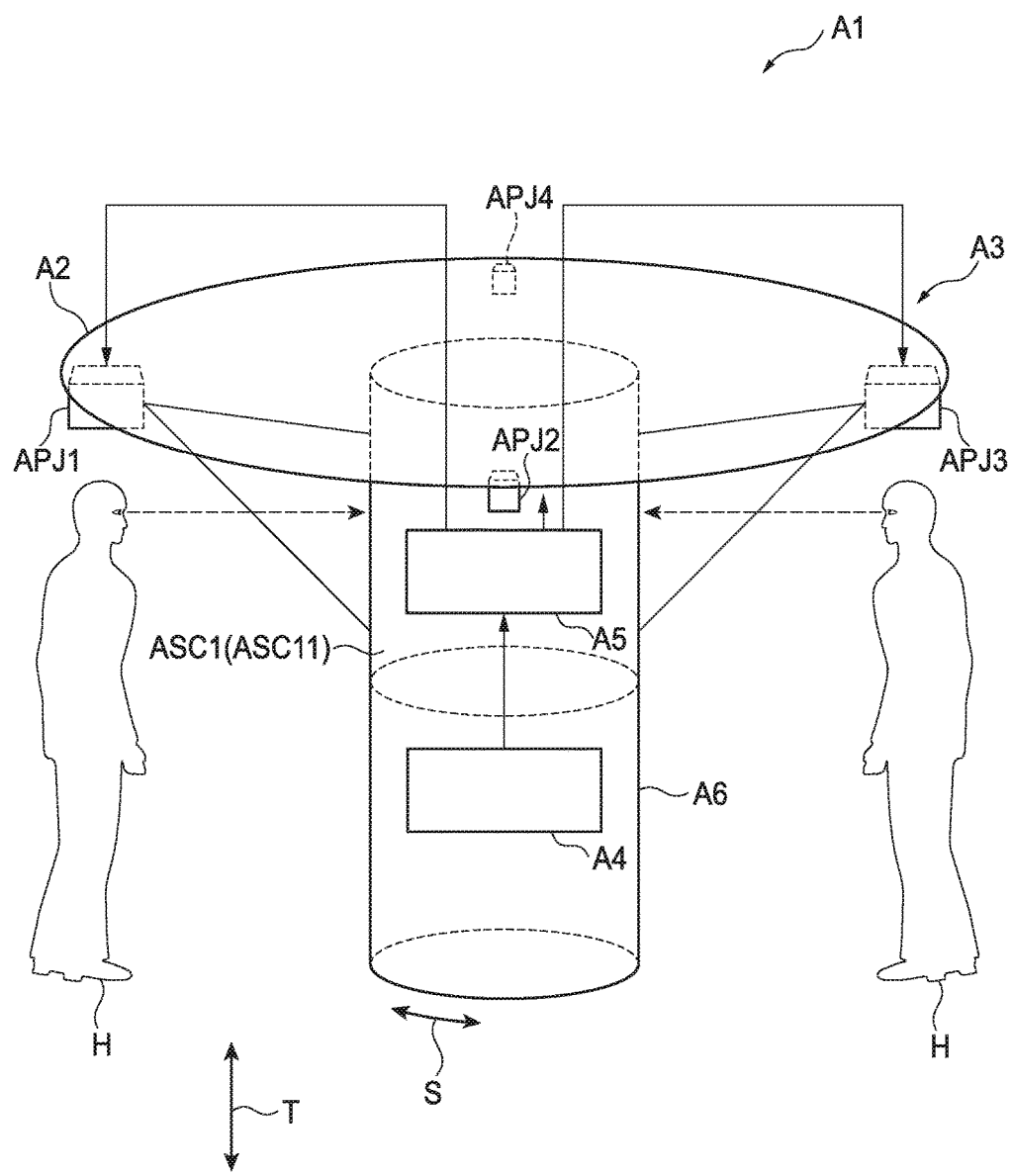
FIG. 16 is a schematic diagram showing the external view of a display apparatus according to a fourth embodiment of the invention.

FIG. 16 is a perspective view showing the external appearance of a display apparatus A1 according to this embodiment. Note that, in FIG. 16, a part of projecting sections APJ configuring a projection device A3 are not shown. In the following figures and explanation, a direction along a center axis AC of a screen ASC1 is represented as a T direction (a first direction) and a circumferential direction centering on the center axis is represented as an S direction (a second direction).

The display apparatus A1 according to this embodiment displays an image of an observation target observed from the position of the observer H and causes the observer H to stereoscopically visually recognize the observation target through the motion parallax. The display apparatus A1 includes the screen ASC1, a holding section A2, the projection device A3, a storage device A4, a display control device A5, and a stand A6.

The holding section A2 is a member that holds the projection device A3. The stand A6 holds the holding section A2. The stand A6 is a pedestal to which the screen ASC1 is attached and on which the storage device A4 and the display control device A5 are provided.

Configurations of the Storage Device and the Display Control Device.

The storage device A4 stores image information of an image projected by the projection device A3. As the storage device A4, a storage device having a relatively large capacity such as a HDD (Hard Disk Drive) can be illustrated.

The display control device A5 is equivalent to the control section according to the invention. The display control device A5 causes the storage device A4 to store image information received from an external apparatus via a network or the like, forms an image, which the display control, device A5 causes the projection device A3 to project, from the image information stored in the storage device A4, and transmits the image to the projection device A3. Specifically, the display control device A5 transmits information concerning images (image data), which the display control device A5 causes the projecting sections APJ configuring the projection device A3 to project, to each of the projecting sections APJ.

Configuration of the Screen

Figure 17:
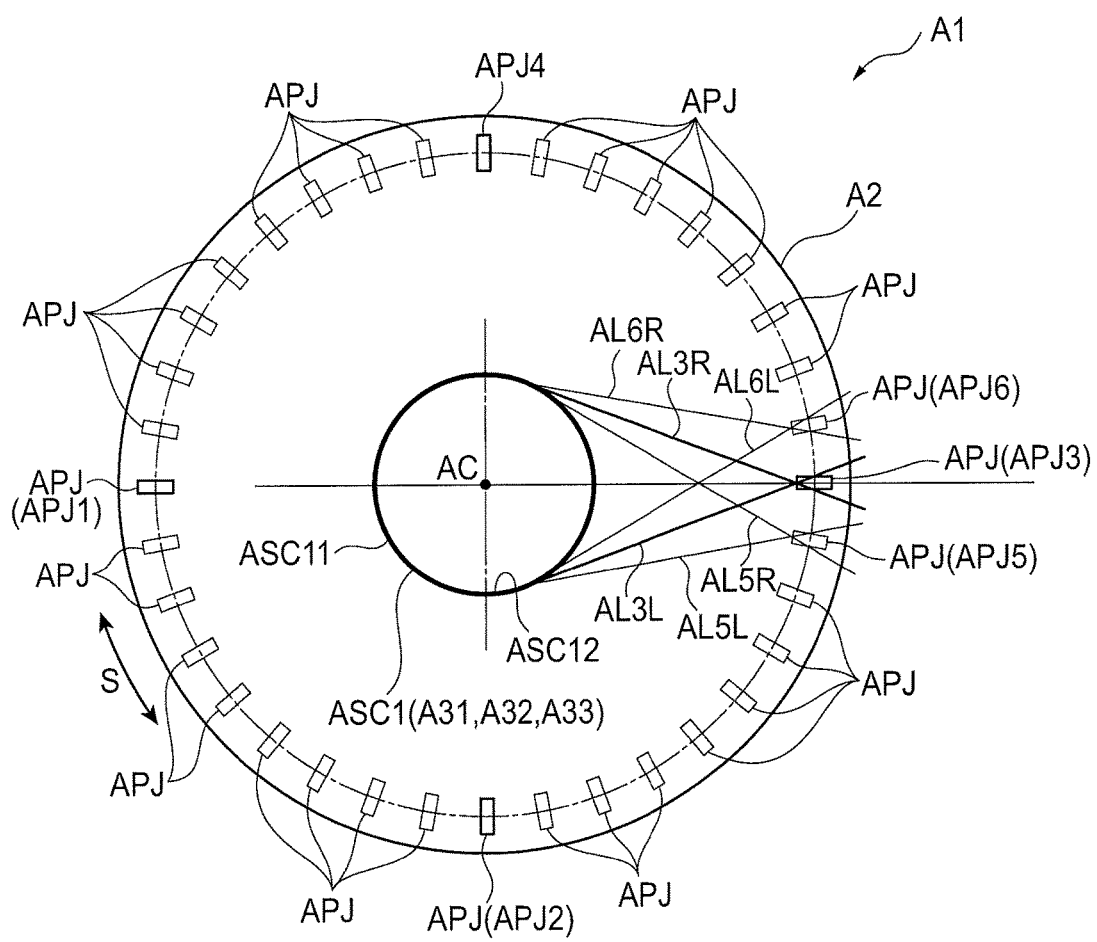
FIG. 17 is a diagram of the display apparatus viewed from a direction along the center axis of the display apparatus in the fourth embodiment.

FIG. 17 is a diagram of the display apparatus A1 (the screen ASC1) viewed from the direction along the center axis AC.

The screen ASC1 is a reflection-type screen that is attached to the stand A6 to cover the outer circumferential surface of the stand A6 and reflects an image projected from the projection device A3 (specifically, the projecting sections APJ configuring the projection device A3). In this embodiment, the screen ASC1 is formed in a substantially cylindrical shape centering on the center axis AC. The screen ASC1 includes a substrate A30 (see FIG. 18), a retroreflective layer A31, and a transmissive diffusion layer A32.

The substrate A30 is formed in a substantially cylindrical shape by a light transmissive member. The retroreflective layer A31 is arranged on the inner circumference side of the substrate A30. The diffusion layer A32 is arranged on the outer circumference side of the substrate A30. That is, the diffusion layer A32 is located on the projection device A3 side (the outer circumference side) with respect to the retroreflective layer A31.

The retroreflective layer A31 configures an outer circumferential surface ASC11 of the screen ASC1 with a reflection surface of the retroreflective layer A31 directed to the outer circumferential side (i.e., the projection device A3 side). The retroreflective layer A31 has a function of reflecting incident light to a direction opposite to an incident direction of the light. For example, as shown in FIG. 17, the recursive refection layer A31 reflects a beam AL3R, which is projected from the projection device A3 (a projecting section APJ3), to a direction opposite to an incident direction of the beam AL3R and reflects a beam AL3L in a direction opposite to an incident direction of the beam AL3L.

The retroreflective layer A31 is configured by a retroreflective material. For example, the retroreflective layer A31 has a configuration in which a plurality of micro glass beads are arranged on a base material via a reflection layer and a laminate layer is formed on the surfaces of the glass beads. With such a configuration, when light is made incident on the retroreflective layer A31 from the laminate layer side, the light passes through the glass beads and is reflected on the reflection layer to pass through the glass beads again and emitted in a direction opposite to an incident direction of the light on the retroreflective layer A31.

Note that a retroreflective material provided with a plurality of micro prisms instead of the glass beads may be adopted. The plurality of micro prisms may have a so-called corner reflector shape, three reflection surfaces of which are orthogonal to one another.

As explained above, the diffusion layer A32 is arranged on the outer side of the retroreflective layer A31 and configures an outer circumferential surface ASC11 of the screen ASC1. The diffusion layer A32 has a function of diffusing incident light wider in the direction T (the first direction) along the center axis AC than in the circumferential direction S (the second direction) centering on the center axis AC. In other words, the diffusion layer A32 diffuses light transmitted through the diffusion layer A32 wide in the direction T and diffuses the light narrow in the direction S.

Figure 18:
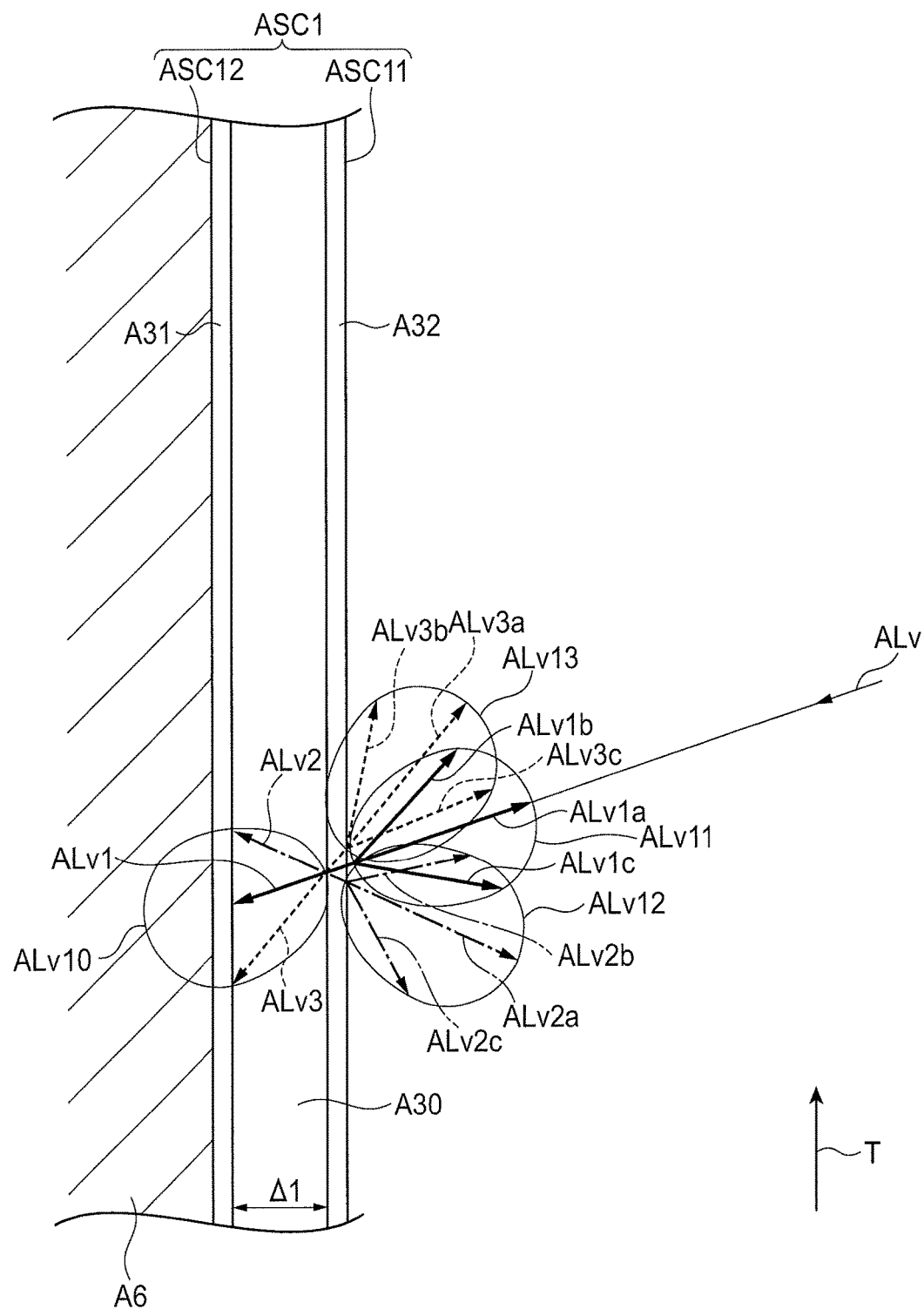
FIG. 18 is a sectional view of a screen along the center axis of the screen in the fourth embodiment.
Figure 19:
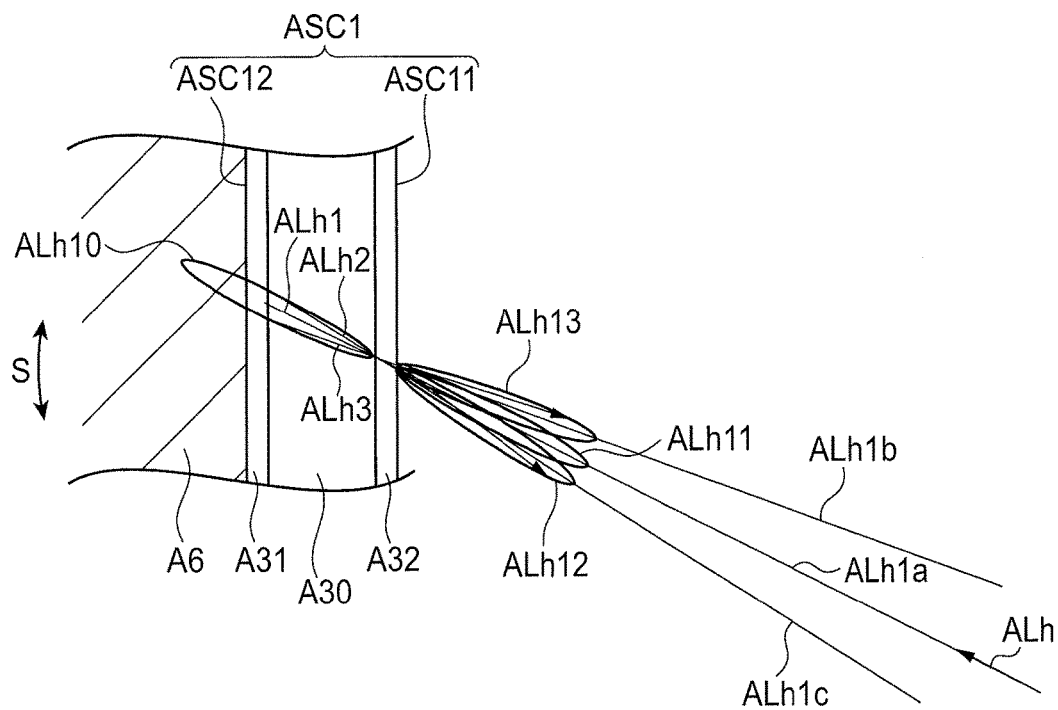
FIG. 19 is a sectional view of the screen in a direction orthogonal to the center axis of the screen in the fourth embodiment.

FIG. 18 is a schematic sectional view in the T direction showing a part of the screen ASC1 in enlargement. FIG. 19 is a schematic sectional view in the S direction showing a part of the screen ASC1 in enlargement. Note that, since the screen ASC1 is formed in a cylindrical shape, actually, the screen ASC1 is displayed in an arcuate shape. However, by enlarging a part of the screen ASC1, the screen ASC1 is approximately indicated by a straight line.

In this embodiment, as shown in FIG. 18, the diffusion layer A32 diffuses incident light at a diffusion angle equal to or larger than 40° and smaller than 60° in the direction along the center axis AC centering on a direction in which the incident light passes through the diffusion layer A32.

As shown in FIG. 19, the diffusion layer A32 diffuses incident light at a diffusion angle equal to or larger than 1° and smaller than 2° in the circumferential direction S centering on a direction in which the incident light passes through the diffusion layer A32.

The diffusion layer A32 is manufactured by, for example, transferring a mold having a micro surface structure generated by interference of a laser beam onto a resin substrate of polycarbonate, polyethylene, or the like applied with a photocuring agent and irradiating an ultraviolet ray on the resin substrate.

Reflection of Light Projected on the Screen

Reflection of light (a beam) made incident on ASC1 in the direction T (the first direction) along the center axis AC is explained in detail below with reference to FIG. 18. Note that, in FIG. 18, diffused beams are represented by, for example, three beams. However, actually, the light changes to innumerable beams and diffuses.

For example, when a beam Lv made incident on the inner circumferential surface of the screen ASC1 is made incident on the diffusion layer A32, as shown in FIG. 18, the beam Lv is diffused in the direction T along the center axis AC at a wider angle (e.g., equal to or larger than 40° and smaller than 60°) by passing through the diffusion layer A32. Diffused incident light ALv10 is made incident on the retroreflective layer A31. The diffused incident light ALv10 is reflected by the retroreflective layer A31 in a direction substantially the same as an incident direction of the light made incident on the retroreflective layer A31 and is emitted toward the diffusion layer A32. Specifically, for example, when a beam ALv is made incident on the diffusion layer A32, a beam ALv1 emitted in a direction same as the direction of the beam ALv and beams ALv2 and ALv3 diffused in the T direction are made incident on the retroreflective layer A31. The beam ALv1, the beam ALv2, and the beam ALv3 are reflected by the retroreflective layer A31 in a direction substantially the same as the direction of the light made incident on the retroreflective layer A31 and are emitted toward the diffusion layer A32.

Consequently, the beam ALv1, the beam ALv2, and the beam ALv3, which are parts of beams emitted to the diffusion layer A32, are diffused in the T direction by the diffusion layer A32. That is, the beam ALv supplied to the diffusion layer A32 is diffused again by the diffusion layer A32 and changes to a diffused beam ALv1 including a beam ALv1a emitted in a direction same as the direction of the beam ALv and beams ALv1b and ALv1c diffused in the T direction. Similarly, the beam ALv2 supplied to the diffusion layer A32 is diffused by the diffusion layer A32 again and changes to a diffused beam ALv12 including a beam ALv2a emitted in a direction same as the direction of the beam ALv2 and beams ALv2b and ALv2c diffused in the T direction. Further, the beam ALv3 supplied to the diffusion layer A32 is diffused by the diffusion layer A32 again and changes to a diffused beam ALv13 including a beam ALv3a emitted in a direction same as the direction of the beam ALv3 and beams ALv3b and ALv3c diffused in the T direction.

In this way, the beam ALv is reflected while being diffused at an angle wider than a diffusion angle in the direction along the center axis AC of the diffusion layer A32.

Reflection of light (a beam) made incident on the screen ASC1 in the circumferential direction S is explained in detail below with reference to FIG. 19. Note that, in FIG. 19 as well, diffused beams are represented by, for example, three beams. However, actually, the light changes to innumerable beams and diffuses.

For example, when a beam ALh made incident on the inner circumferential surface of the screen ASC1 is made incident on the diffusion layer A32, as shown in FIG. 19, the beam ALh is diffused in the circumferential direction S at a narrow angle (e.g., equal to or larger than 1° and smaller than 2°) by passing through the diffusion layer A32. Diffused incident light ALh10 is made incident on the retroreflective layer A31. The slightly diffused incident light ALh10 is reflected by the retroreflective layer A31 in a direction substantially the same as an incident direction of the light made incident on the retroreflective layer A31 and is emitted toward the diffusion layer A32. Specifically, for example, when the beam ALh is made incident on a diffusion sheet, a beam ALh1 emitted in a direction same as the direction of the beam ALh and beams ALh2 and ALh3 diffused in the circumferential direction S are made incident on the retroreflective layer A31. The beam ALh1, the beam ALh2, and the beam ALh3 are reflected by the retroreflective layer A31 in a direction substantially the same as the direction in which the beam ALh1, the beam ALh2, and the beam ALh3 are made incident on the retroreflective layer A31 and are emitted toward the diffusion layer A32.

Consequently, the beam ALh1, the beam ALh2, and the beam ALh3 emitted to the diffusion layer A32 are diffused in the circumferential direction S by the diffusion layer A32. That is, the beam ALh1 supplied to the diffusion layer A32 is slightly diffused again by the diffusion layer A32 and changes to a diffused beam ALh11 including a beam ALh1a emitted in a direction same as the direction of the beam ALh1 and a beam slightly diffused in the circumferential direction S. Similarly, the beam ALh2 supplied to the diffusion layer A32 is slightly diffused again by the diffusion layer A32 and changes to a diffused beam ALh12 including a beam ALh2a emitted in a direction same as the direction of the beam ALh2 and a beam diffused in the circumferential direction S. Further, the beam ALh3 supplied to the diffusion layer A32 is slightly diffused again by the diffusion layer A32 and changes to a diffused beam ALh13 including a beam ALh3a emitted in a direction same as the direction of the beam ALh3 and a beam diffused in the circumferential direction S.

That is, since a diffusion angle (e.g., equal to or larger than 1° and smaller than 2°) in the circumferential direction S (the second direction) is extremely narrow, the beam ALh made incident on the diffusion layer A32 is slightly diffused and reflected by the retroreflective layer A31.

Note that, as shown in FIGS. 18 and 19, the retroreflective layer A31 and the diffusion layer A32 are fixed in while being arranged with a proper space Δ1 apart from each other by the substrate A30. However, not only this, but the retroreflective layer A31 and the diffusion layer A32 may be closely attached to each other or may be arranged with a space different from the space Δ1 apart from each other by, for example, changing a thickness dimension of the substrate A30.

Configuration of the Projection Device

The projection device A3 projects an image on the screen ASC1. The projection device A3 includes the plurality of projecting sections APJ.

The plurality of projecting sections APJ are configured to be capable of respectively separately projecting images received from the display control device A5. As shown in FIG. 17, the projecting sections APJ are respectively arranged at an equal interval along an imaginary circle AVc centering on the center axis AC and are fixed to the holding section A2. Specifically, although not shown in the figure, the projecting sections APJ include light sources, light modulating devices that modulate lights emitted from the light sources, and projection optical devices that project the modulated lights (image lights). The respective projecting sections APJ are arranged such that pupil positions (exit pupil positions) of the projection optical devices are arranged on the imaginary circle AVc.

The plurality of projecting sections APJ project images corresponding to projecting directions of the respective projecting sections APJ. When it is assumed that an observation target stereoscopic image is located on the center axis AC, the images are images including images of the observation target observed from positions (visual points) where the images projected from the respective projecting sections APJ are observed.

For example, according to the control by the display control device A5, the projecting section APJ3 projects, toward the outer circumferential surface ASC11 of the screen ASC1, an image including an image of the observation target observed from a visual point of an image projected from the projecting section APJ3. Consequently, when the eyes of the observer H are located at a visual point of the image projected by the projecting section APJ3 and reflected on the screen ASC1 and observed, that is, a visual point located right below the projecting section APJ3, an image including an image of the observation target observed from the present positions of the eyes of the observer H is visually recognized by the observer. The same applies when the eyes of the observer H are located in other positions.

Projection Width of Image Lights Projected from the Projecting Sections

The projecting sections APJ respective project images having the same size (longitudinal dimension and width dimension) at the same angle of view (projection width).

For example, as shown in FIG. 17, the projecting section APJ3 projects an image within a range sandwiched between the beam AL3L and the beam AL3R. A projecting section APJ5 projects an image within a range sandwiched between a beam AL5L and a beam AL5R. Similarly, a projecting section APJ6 projects an image within a range sandwiched by a beam AL6L and a beam AL6R.

Track of Image Light Projected from the Projecting Section

Figure 20:
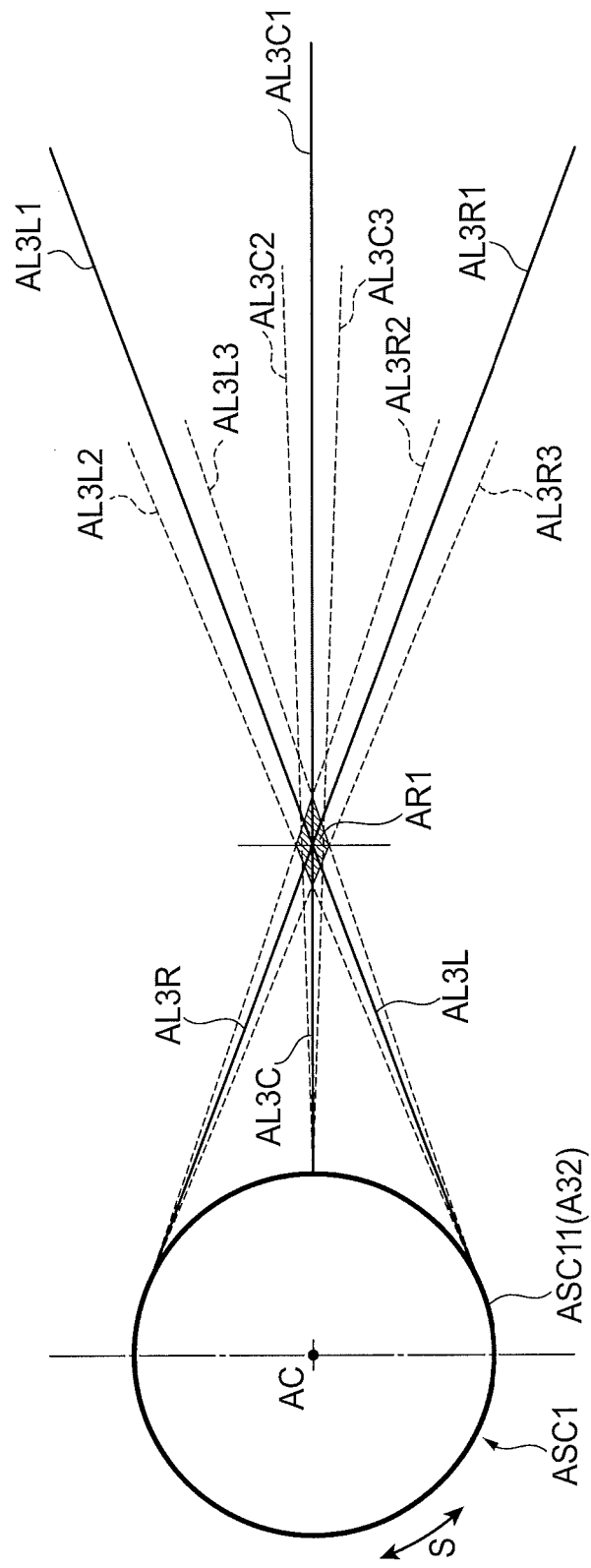
FIG. 20 is a diagram schematically showing a track of image light projected from a projecting section in the fourth embodiment.

FIG. 20 is a diagram schematically showing a track of light projected from the projecting section APJ3 shown in FIG. 17. Note that, in FIG. 20, the light projected from the projecting section APJ3 is schematically represented by three beams. However, actually, the light changes to innumerable beams and diffuses.

For example, in the image light projected from the projecting section APJ3, the beam AL3L passing one end of the circumferential direction S is reflected and diffused in a direction opposite to an incident direction of the beam AL3L by the screen ASC1. An incident beam on the screen ASC1 is diffused and emitted in the circumferential direction S by the diffusion layer A32. Therefore, the beam AL3L made incident on the screen ASC1 is diffused and emitted in a range centering on a beam AL3L1, which travels in a direction opposite to the incident direction of the beam AL3L on the screen ASC1, and sandwiched between a beam AL3L2 passing one end side of the circumferential direction S and a beam AL3L3 passing the other end side.

Similarly, in the image light projected from the projecting section APJ3, a beam AL3C passing the center of the circumferential direction S is diffused and emitted by the screen ASC1 within a range centering on a beam AL3C1, which travels in a direction opposite to an incident direction of the beam AL3C on the screen ASC1, and sandwiched between a beam AL3C2 passing one end side of the circumferential direction S and a beam AL3C3 passing the other end side.

In the image light projected from the projecting section APJ3, a beam AL3R passing the other end of the circumferential direction S is diffused and emitted by the screen ASC1 within a range centering on a beam AL3R1, which travels in a direction opposite to an incident direction of the beam AL3R on the screen ASC1, and sandwiched between a beam AL3R2 passing one end side of the circumferential direction S and a beam AL3R3 passing the other end side.

The beams AL3L1 to AL3L3, AL3C1 to AL3C3, and AL3R1 to AL3R3 reflected in this way overlap one another in a position on an imaginary straight line passing a pupil position of the projecting section APJ3 and extending along the T direction, that is, an appropriate viewing range AR1 indicated by hatching in FIG. 20. In the appropriate viewing range AR1, substantially entire image light projected from the projecting section APJ3 toward the screen ASC1 is collected. Therefore, if the observer H (the eyes of the observer H) is located in the appropriate viewing range AR1, the observer H can visually recognize an image corresponding to image light projected from the projecting section APJ3.

Similarly, for example, when the observer H moves to an appropriate viewing range set in a position on an imaginary straight line passing a pupil position of the projecting section APJ5 and extending along the T direction, the observer H can visually recognize an image corresponding to image light projected from the projecting section APJ5 toward the screen ASC1.

That is, by moving around the cylindrical screen ASC1, the observer H can visually recognize an image corresponding to image light projected from the projecting section APJ corresponding to the position (the visual point) of the observer H.

As explained above, the light made incident on the screen ASC1 is diffused wide in the direction T along the center axis AC but is only slightly diffused in the circumferential direction S (the second direction). The screen ASC1 includes the retroreflective layer. Therefore, as explained above, the image light reflected by the screen ASC1 returns to the position on the imaginary straight line passing the pupil position of the not-shown projection optical device of the projecting section APJ and extending along the direction T. Consequently, even if different image lights are simultaneously projected from the respective plurality of projecting sections APJ, only an image projected from the projecting section APJ located right above the eyes of the observer H is selectively seen on an external circumferential surface ASC11 of the screen ASC1.

Example of an Observed Image

Figure 21:
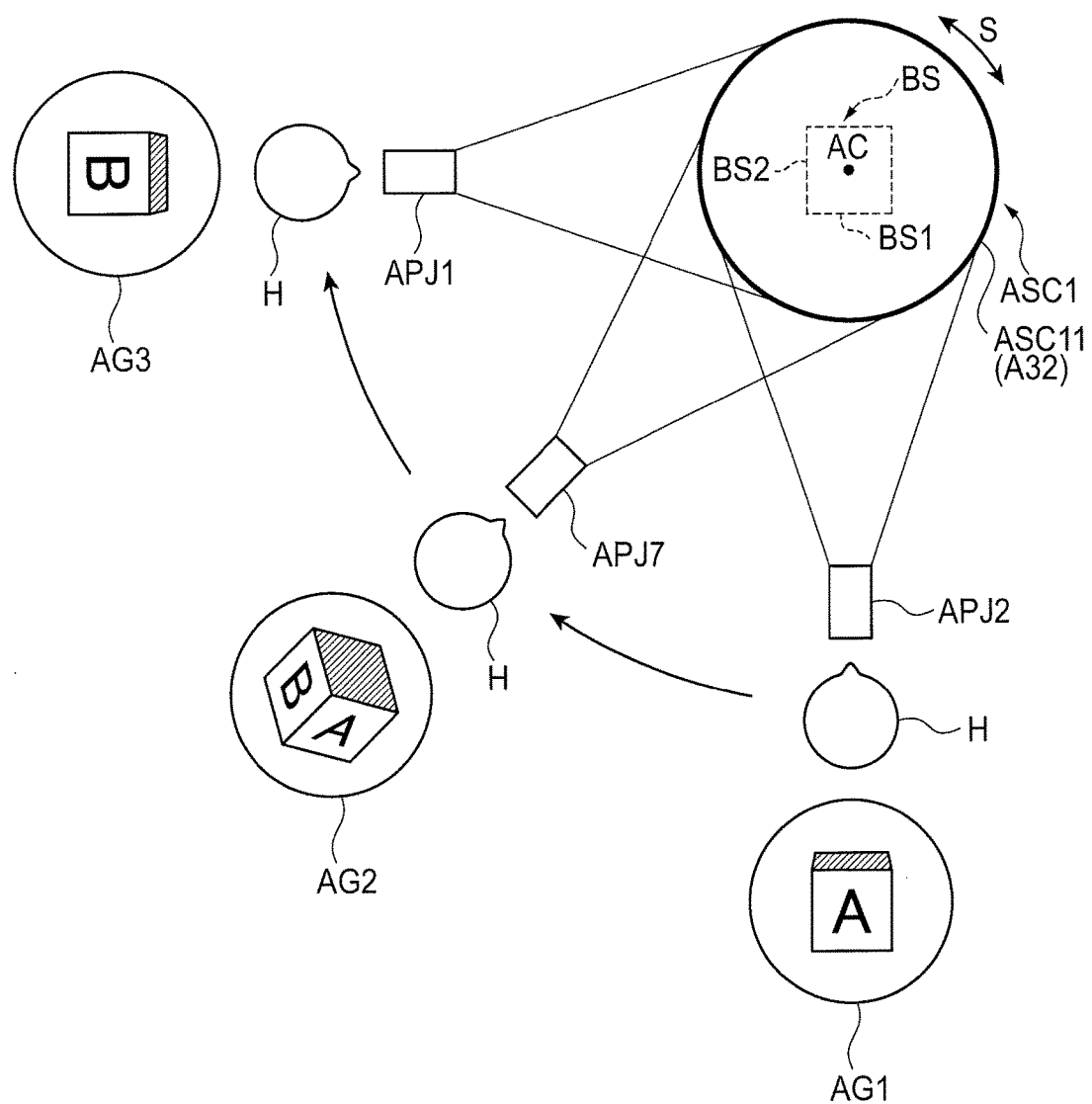
FIG. 21 is a diagram showing an example in which stereoscopic images that can be recognized are different according to the positions of an observer in the fourth embodiment.

FIG. 21 is a diagram showing an example of an image observed in the position of the observer H. Note that, in FIG. 21, to simplify illustration, only the projecting sections APJ necessary for explanation are shown. In FIG. 21, an arrangement state of the observation target BS not actually present is indicated by a dotted line.

When images projected on the screen ASC1 from the plurality of projecting sections APJ are images of the observation target stereoscopic image BS shown in FIG. 6, the images projected from the projecting sections APJ are, for example, as shown in FIG. 21, images AG1 to AG3 including images of the observation target BS obtained when the observation target BS located on the center axis AC is viewed from the appropriate viewing positions corresponding to the projecting sections APJ.

Specifically, when an image projected from a projecting section APJ2 is the image AG1 of the observation target BS shown in FIG. 6 viewed from the direction D1, an image projected from a projecting section APJ7 in a position to which the observer H moves 45 degrees to one end side of the circumferential direction S from the projecting section APJ2 is an image AG2 of the observation target BS viewed from the direction D2 to which the observer H moves in the same direction and at the same angle in the circumferential direction of the observation target BS with respect to the direction D1.

Among these images, the image AG1 is a stereoscopic image of the observation target BS with the surface BS1, on which "A" is displayed, directed to the front. The image AG2 is an image in a direction in which the surface BS1 in the observation target BS and a surface BS2, which crosses the surface BS1 and on which "B" is displayed, are observed.

Further, an image projected from a projecting section APJ1 in a position to which the observer H further moves 45 degrees to one end side of the circumferential direction S from the projecting section APJ7 (an image projected from the projecting section APJ1 in a position to which the observer H moves 90 degrees to one end side of the circumferential direction S from the projecting section APJ2) is the image AG2 of the observation target BS viewed from the direction D3 to which the observer H moves in the same direction 45 degrees along the circumferential direction of the observation target BS with respect to the direction D2 (the direction D3 to which the observer H moves in the same direction 90 degrees along the circumferential direction of the observation target BS with respect to the direction D1). The image AG3 is an image in which the surface BS2 in the observation target BS is directed to the front.

With such a configuration, when the observer H moves from the appropriate viewing position of the projecting section APJ2 to the appropriate viewing position of the projecting section APJ7, the observer H changes from a state in which the observer H can visually recognize the image AG1 including the image of the observation target BS viewed along the direction D1 to a state in which the observer H can visually recognize the image AG2 including the image of the observation target BS viewed along the direction D2. When the observer H moves from the appropriate viewing position of the projecting section APJ7 to the appropriate viewing position of the projecting section APJ1, the observer H changes from the state in which the observer H can visually recognize the image AG2 to a state in which the observer H can visually recognize the image AG3 including the image of the observation target BS viewed along the direction D3. That is, according to the movement of the observer H, the direction of the observation target included in the visually recognized image changes at any time. Therefore, the observer H can stereoscopically visually recognize the observation target BS.

Effects of the Fourth Embodiment

The display apparatus A1 according to the fourth embodiment explained above has effects explained below.

An image projected on the outer circumferential surface ASC11 of the screen ASC1 from the projection device A3 (the projecting sections APJ) is reflected on the retroreflective layer A31 configuring the screen ASC1 and is diffused by the diffusion layer A32. The diffusion layer A32 diffuses light wide in the first direction (the direction along the center axis AC) and narrow in the second direction (the circumferential direction S). Therefore, the light reflected on the screen ASC1 is collected at visual points on straight lines extending along the first direction and passing projection positions of the image (pupil positions of the projection optical devices) in the projecting sections APJ. When the eyes of the observer are located at the visual points (the appropriate viewing range R1), the observer can visually recognize the image.

The projection device A3 (the projecting sections APJ) projects, along projecting directions orthogonal to the center axis AC and different from one another, images corresponding to the projecting directions on the outer circumferential surface ASC11.

Therefore, for example, when the projecting sections APJ respectively project images of the observation target stereoscopic image, which are viewed from observation directions different from one another, along projecting directions corresponding to the observation directions, the observer H can visually recognize an image of the observation target observed from a direction corresponding to the position of the observer H. Therefore, the observer H can stereoscopically view the observation target through the motion parallax.

The projection device A3 (the projecting sections APJ) can project one image along the projecting directions. Therefore, as explained above, compared with the configuration for projecting partial images included in one image according to projecting directions, it is possible to improve the resolution of a projection image. Therefore, it is possible to clearly display an image that can be stereoscopically viewed.

Since the projection device A3 includes the plurality of projecting sections APJ, images of the observation target viewed from directions corresponding to the arrangement positions of the projecting sections APJ can be surely displayed on the outer circumferential surface ASC11. Therefore, by changing the position of the observer H, the observer H can stereoscopically recognize the observation target included in respective projection images through the motion parallax.

The plurality of projecting sections APJ arranged on the imaginary circle AVc respectively project images on an outer circumferential surface ACS11. Therefore, even when there are a plurality of observers H, the observers H can visually recognize the images.

Further, the plurality of projecting sections APJ are held by the holding section A2 in a position higher than the positions of the screen ASC1 and the head of the observer H. Therefore, compared with when the plurality of projecting sections APJ are held in a position lower than the positions of a screen ASC1 and the head of the observer H, the observer H can move closer to the screen ASC1. Therefore, it is possible to prevent the plurality of projecting sections APJ from hindering the observation of the screen ASC1.

Modification of the Fourth Embodiment

Figure 22:
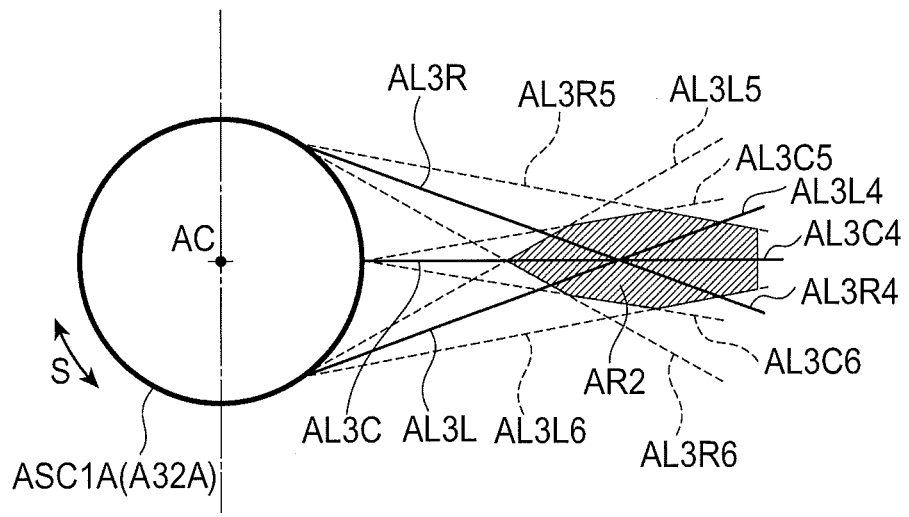
FIG. 22 is a plan view of a screen of a display apparatus viewed from a direction along the center axis of the screen in a modification of the fourth embodiment.

FIG. 22 is a plan view of a screen ASC1A viewed from the T direction. Note that, in FIG. 22, although twelve projecting sections APJ are originally arranged at an equal interval to surround the screen ASC1A, for convenience of explanation, illustration of the projecting sections APJ is omitted. As in FIG. 20, light projected from the projecting section APJ3 is schematically represented by three beams. However, actually, the light changes to innumerable beams and diffuses.

In the fourth embodiment, the diffusion angle in the circumferential direction S of the diffusion layer A32 of the screen ASC1 is, for example, equal to or larger than 1° and smaller than 2°. However, the invention is not limited to this. For example, as shown in FIG. 22, the diffusion angle in the circumferential direction S by the diffusion layer A32 may be 20°.

For example, in the image light projected from the projecting section APJ3, the beam AL3L passing one end of the circumferential direction S is reflected and diffused in a direction opposite to the incident direction of the beam AL3L by the screen ASC1. The incident beam on the screen ASC1 is diffused and emitted in the circumferential direction S by the diffusion layer A32. Therefore, the beam AL3L made incident on the screen ASC1 is diffused and emitted in a range centering on a beam AL3L4, which travels in a direction opposite to the incident direction of the beam AL3L on the screen ASC1, and sandwiched between a beam AL3L5 passing one end side of the circumferential direction S and a beam AL3L6 passing the other end side.

Similarly, in the image light projected from the projecting section APJ3, the beam AL3C passing the center of the circumferential direction S is reflected and diffused by the screen ASC1 in a range centering on a beam AL3C4, which travels in a direction opposite to the incident direction of the beam AL3C on the screen ASC1, and sandwiched between a beam AL3C5 passing one end side of the circumferential direction S and a beam AL3C6 passing the other end side.

In the image light projected from the projecting section APJ3, the beam AL3R passing the other end of the circumferential direction S is reflected and diffused by the screen ASC1 in a range centering on a beam AL3R4, which travels in a direction opposite to the incident direction of the beam AL3R on the screen ASC1, and sandwiched between a beam AL3R5 passing one end side of the circumferential direction S and a beam AL3R6 passing the other end side.

The beams AL3L4 to AL3L6, AL3C4 to AL3C6, and AL3R4 to AL3R6 reflected in this way overlap one another in a position on an imaginary straight line passing a pupil position of the projecting section APJ3 and extending along the T direction, that is, an appropriate viewing range AR2 indicated by hatching in FIG. 22. In the appropriate viewing range AR2, substantially entire image light projected from the projecting section APJ3 toward the screen ASC1 is collected. Therefore, if the observer H (the eyes of the observer H) is located in the appropriate viewing range AR2, the observer H can visually recognize an image corresponding to image light projected from the projecting section APJ3.

Figure 23:
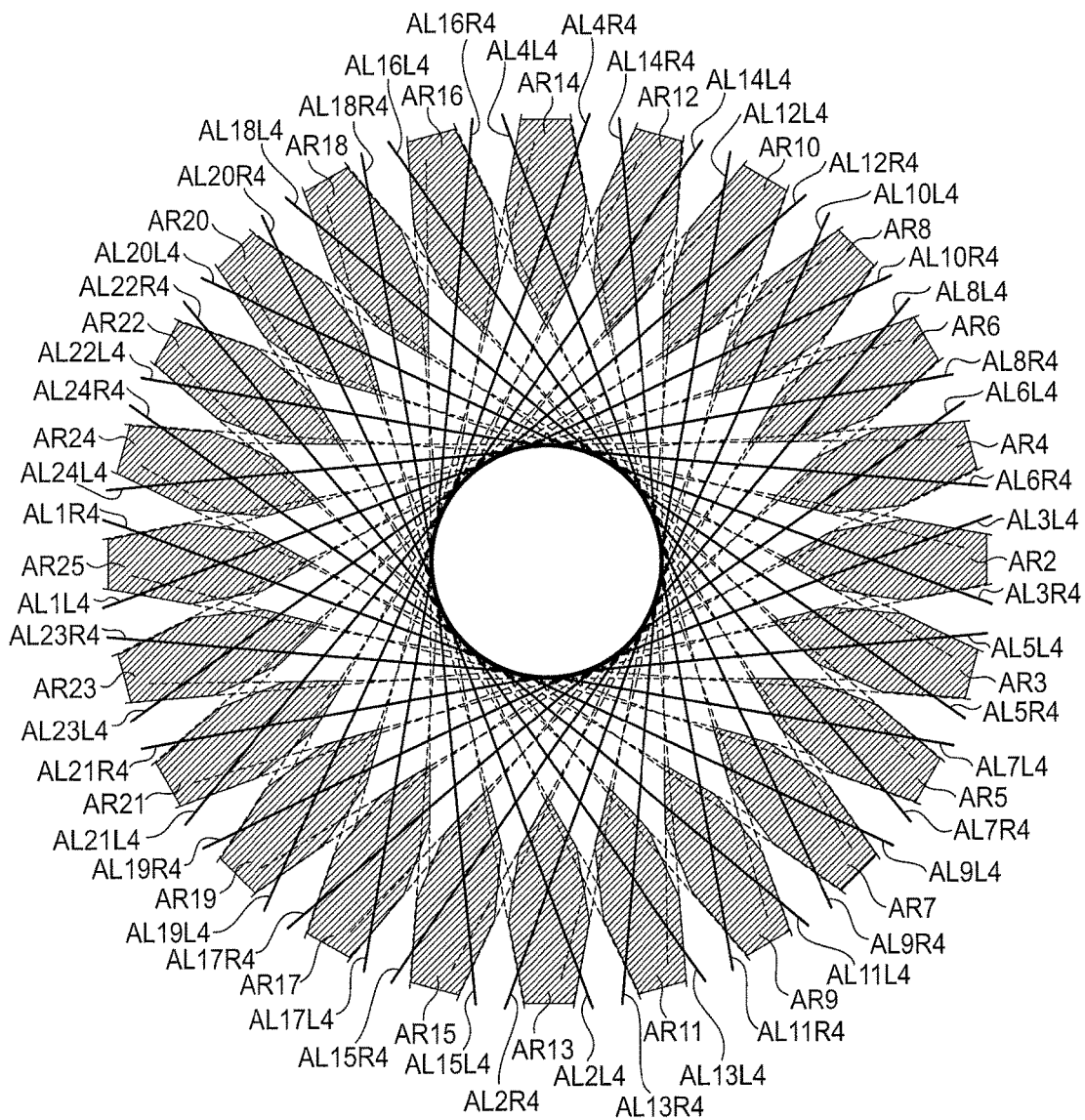
FIG. 23 is a diagram schematically showing a track of image light projected from a projecting section in the modification of the fourth embodiment.

FIG. 23 is a diagram schematically showing reflected lights (emitted lights) of lights projected on the screen ASC1A from not-shown twenty-four projecting sections APJ. Note that, in FIG. 23, only left and right beams of image lights projected from the not-shown twenty-four projecting sections APJ and reflected by the screen ASC1A and appropriate viewing ranges, which are regions where images respectively projected from the not-shown projecting sections APJ can be accurately recognized, are shown.

When image lights are respectively projected from the not-shown twenty-four projecting sections APJ, the image lights are reflected by a diffusion layer A32A of the screen ASC1A. As shown in FIG. 23, appropriate viewing ranges AR2 to AR25 including left and right beams AL1R4 to AL24L4 and AL1L4 to AL24L4 of the image lights are formed. All of the appropriate viewing ranges AR2 to AR25 are formed larger than the appropriate viewing range AR1 in the fourth embodiment. That is, if the observer H (the eyes of the observer H) is located in the range of the appropriate viewing ranges AR2 to AR25, the observer H can recognize an image projected from the not-shown projecting section APJ arranged right above the observer H.

Effects of the Modification of the Fourth Embodiment

In this modification, since the appropriate viewing ranges AR2 to AR25 are formed larger than the appropriate viewing range AR1 in the fourth embodiment, the observer H can recognize an image projected on the screen ASC1A in a wider range. Consequently, the observer H can recognize different images with the right eye and the left eye. For example, if the right eye is located in the appropriate viewing range AR2 and the left eye is located in an appropriate viewing range AR3, the observer H can recognize different images with both the eyes. The observer H can recognize a high-resolution clear stereoscopic image.

The appropriate viewing ranges AR2 to AR25 are formed larger than the appropriate viewing range AR1 in the fourth embodiment. An image at one visual point (one appropriate viewing range) is generated by projection light projected from one projecting section APJ. Therefore, it is possible to reduce the number of the projecting sections APJ and attain a reduction in costs. Note that a diffusion angle may be appropriately set to prevent a gap from being formed among the appropriate viewing ranges AR2 to AR25. Even when a gap is formed, the observer H only has to move an observation position.

Further, as in the fourth embodiment, when the observer H moves around the cylindrical screen ASC1A, the motion parallax occurs. Therefore, the observer H can recognize a clear stereoscopic image.

Fifth Embodiment

A display apparatus according to a fifth embodiment of the invention is explained.

The display apparatus according to this embodiment is different from the display apparatus A1 in a projection device and a stand and different in that the projection device is controlled on the basis of a detection result by a sensor that detects an observer. Note that, in the following explanation, components the same as or substantially the same as the components explained above are denoted by the same reference numerals and signs and explanation of the components is omitted.

Schematic Configuration of the Display Apparatus

Figure 24:
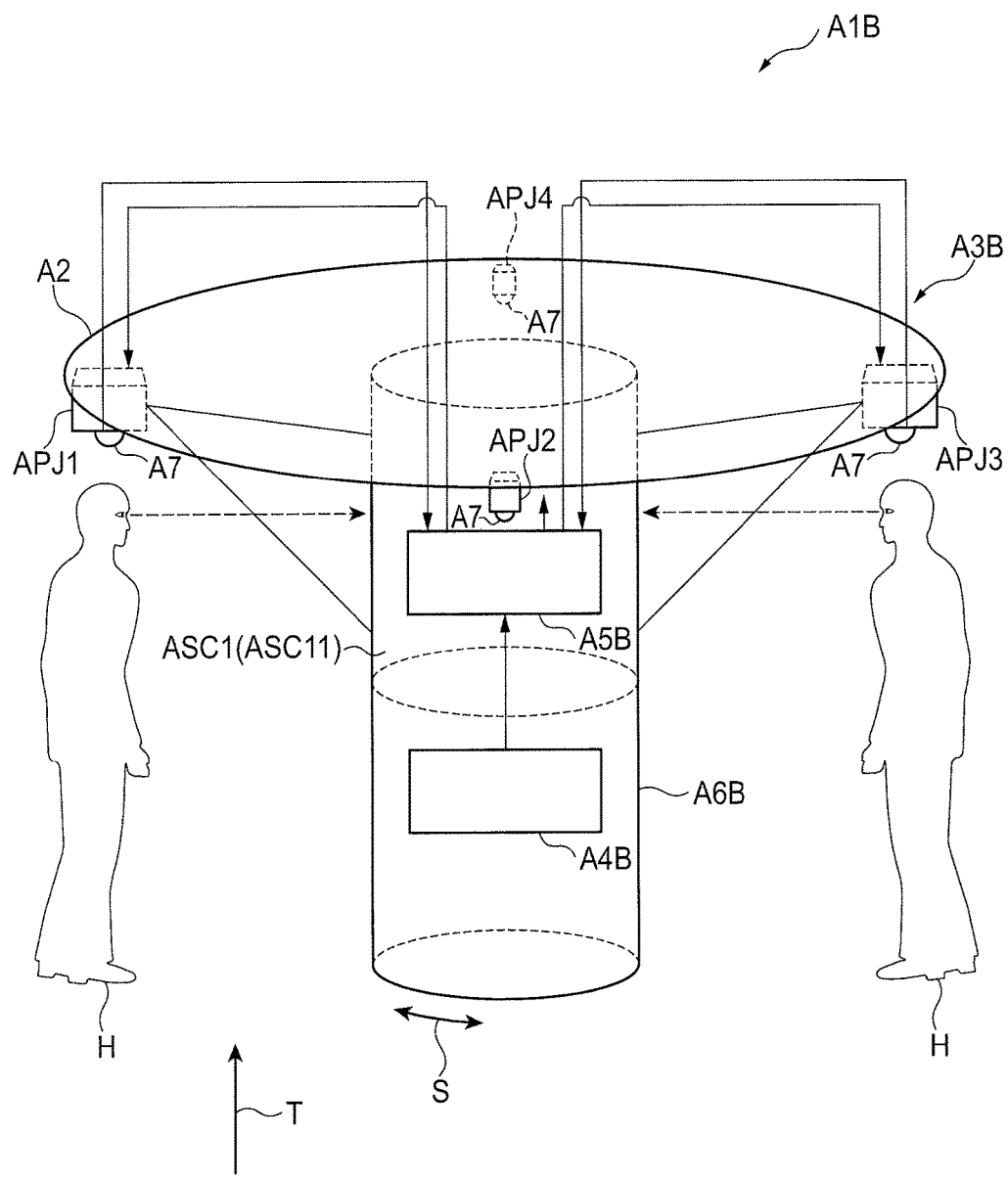
FIG. 24 is a schematic diagram showing the external view of a display apparatus according to a fifth embodiment of the invention.

FIG. 24 is a plan view showing a display apparatus A1B according to the fifth embodiment.

The display apparatus A1B according to this embodiment has functions same as the functions of the display apparatus A1. Specifically, the display apparatus A1B includes, as shown in FIG. 24, the screen ASC1, a projection device A3B, a storage device A4B, a display control device A5B, a stand A6B, and sensors A7. The display apparatus A1B has a function of changing, according to whether the observer H is present in detection ranges of the sensors A7, an image projected from the projection device A3B (the projecting sections APJ). The display apparatus A1B causes the observer H to stereoscopically visually recognize an observation target through the motion parallax.

The stand A6B is a pedestal on which the storage device A4B and the display control device A5B are provided. The sensors A7 are equivalent to the observer detecting section according to the invention. The sensors A7 have a function of detecting the observer H who observes the screen ASC1 located within a predetermined detection range. The sensors A7 are configured by, for example, ultrasound transmitting and receiving elements, infrared LEDs, and sensors such as photodiodes. The sensors A7 are electrically connected to the display control device A5B.

The display control device A5B is equivalent to the control section and the determining section according to the invention. The display control device A5B has functions same as the functions of the display control device A5 and has a function of determining whether the observer H is detected by the sensors A7. Note that, although the display control device A5B has the determining function, a determining section may be provided separately from the display control device A5B.

Detection Range of the Sensor

Figure 25:
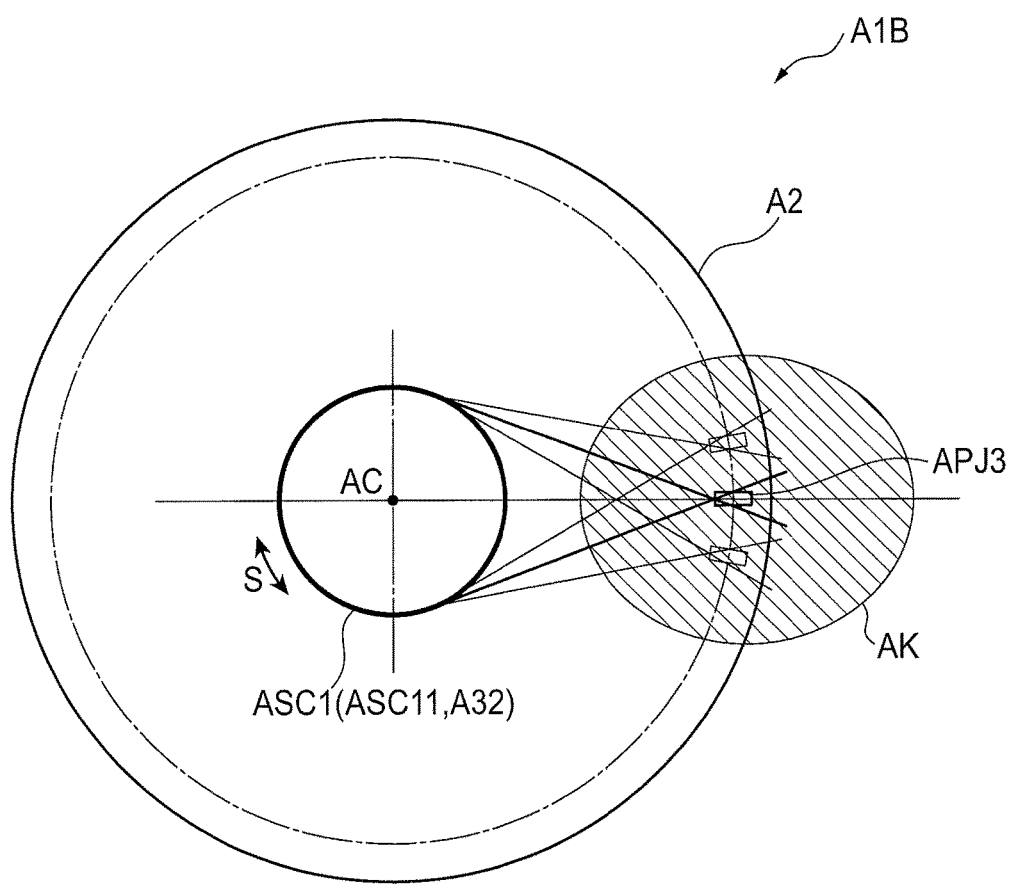
FIG. 25 is a diagram showing a detection range of a sensor in the fifth embodiment.

FIG. 25 is a diagram showing the detection range of the sensor A7.

The appropriate viewing range ART formed when image light projected from the projecting section APJ3 is reflected on the screen ASC1 in this embodiment is formed in a position right below the projecting section APJ3 as in the fourth embodiment. Therefore, as shown in FIG. 25, the detection range of the sensor A7 provided on an end face of the projecting section APJ3 is set in a predetermined detection range AK including the position right below the projecting section APJ3. Note that the sensors A7 are respectively provided on end faces of the projecting sections APJ as well. Therefore, the detection ranges of the sensors A7 are respectively set in detection ranges including positions right below the projecting sections APJ in which the sensors A7 are provided. Detection results of the sensors A7 are transmitted to the display control device A5B electrically connected to the sensors A7.

Functions of the Display Control Device

The display control device A5B converts a plurality of kinds of image information stored in the storage device A4B into image signals and transmits different image signals respectively to the plurality of projecting sections APJ. The display control device A5B has a function of changing, on the basis of the detection results transmitted from the sensors A7, images projected from the plurality of projecting sections APJ. Specifically, for example, when determined on the basis of a detection results of the sensor A7 provided in the projecting section APJ3 that the observer H is present in the detection range, the display control device A5B causes all the projecting sections APJ to project images of the observation target viewed from the positions of all the projecting sections APJ (i.e., images corresponding to projecting directions). On the other hand, when determining on the basis of the detection result of the sensor A7 that the observer H is absent in the detection range, the display control device A5B causes all the projecting sections APJ to project images (images of representative visual points, for example, images of the observation target viewed from the positions of the projecting sections APJ) different from the images corresponding to the projecting directions.

Note that, in the display control device A5B, CPUs, ROMs that store computer programs, and RAMs that execute calculation, which are not shown in the figure, are respectively provided. The various kinds of processing explained above are executed on the basis of the computer programs stored in the ROMs in advance.

Display Control Processing

Figure 26:
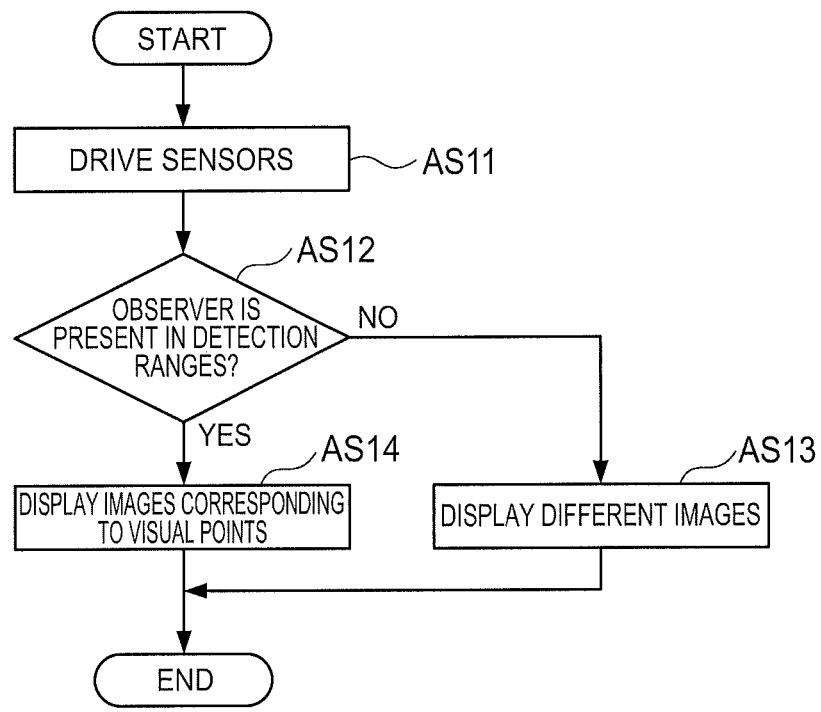
FIG. 26 is a flowchart for explaining a display control processing procedure of the display apparatus in the fifth embodiment.

FIG. 26 is a flowchart for explaining as display control processing procedure in the display apparatus A1B.

First, when electric power is supplied to the display apparatus A1B, the sensors A7 are driven (step AS11). The display control device A5B acquires outputs (detection results) of the sensors A7 and determines whether the observer H is present within the detection ranges (step AS12). When determining that the observer H is absent in the detection ranges of the sensors A7 (NO in step AS12), the display control device A5B causes the projecting sections APJ to project images different from images of the observation target viewed from the respective positions of the projecting sections APJ (step AS13). As an example, the display control device A5B causes all the projecting sections APJ to project the same images such as images of representative visual points or causes all the projecting sections APJ to project black images.

On the other hand, when determining that the observer H is present within the detection ranges of the sensors A7 (YES in step AS12), the display control device A5B causes the projecting sections APJ to project images of the observation target viewed from the respective positions of the projecting sections APJ (step AS14).

Note that, in the display control processing, after steps AS13 to AS14 are executed, the processing of steps AS12 to AS14 is repeated until the supply of the electric power is stopped.

Effects of the Fifth Embodiment

With the display apparatus A1B according to the fifth embodiment, effects same as the effects of the display apparatus A1 according to the fourth embodiment are attained. Besides, effects explained below are attained.

In this embodiment, when the observer H is not detected by the sensor A7, that is, when the observer H is away from the screen ASC1, the images different from the images of the observation target viewed from the respective positions of the projecting sections APJ are projected on the outer circumferential surface ASC11. Therefore, images corresponding to presence and absence of the observer H in the detection ranges are projected on the screen ASC1. Consequently, when the observer H approaches the screen ASC1, the observer H can recognize different images because images corresponding to the positions of the plurality of projecting sections APJ are respectively projected from the projecting sections APJ. Therefore, it is possible to attract interest of the observer H. That is, it is possible to execute an effective advertisement on the screen ASC1.

Modification of the Fifth Embodiment

When determining in step AS12 in the fifth embodiment that the observer H is absent in the detection ranges, the display control device A5B causes the projecting sections APJ to project the images different from the images of the observation target viewed from the respective positions of the projecting sections APJ. However, the invention is not limited to this. For example, the display control device A5B may control a power supply of the projection device A3B (the projecting sections APJ) to off.

Further, after determining that the observer H is absent in the detection ranges, the display control device A5B may control the power supply of the projection device A3B (the projecting sections PJ) to off after causing all the projecting sections APJ to project images having a single color of black.

In this case, in the display control processing, after all the projecting sections APJ are caused to project the images having the single color of black, the steps of the detection of the observer H and the determination are repeated until the supply of the electric power is stopped.

Like the projection device A3 in the fourth embodiment, the projection device A3B in the fifth embodiment includes the plurality of projecting sections APJ arranged at a predetermined interval. The arrangement interval of the plurality of projecting sections APJ may be set to, for example, about 65 mm.

Figure 27:
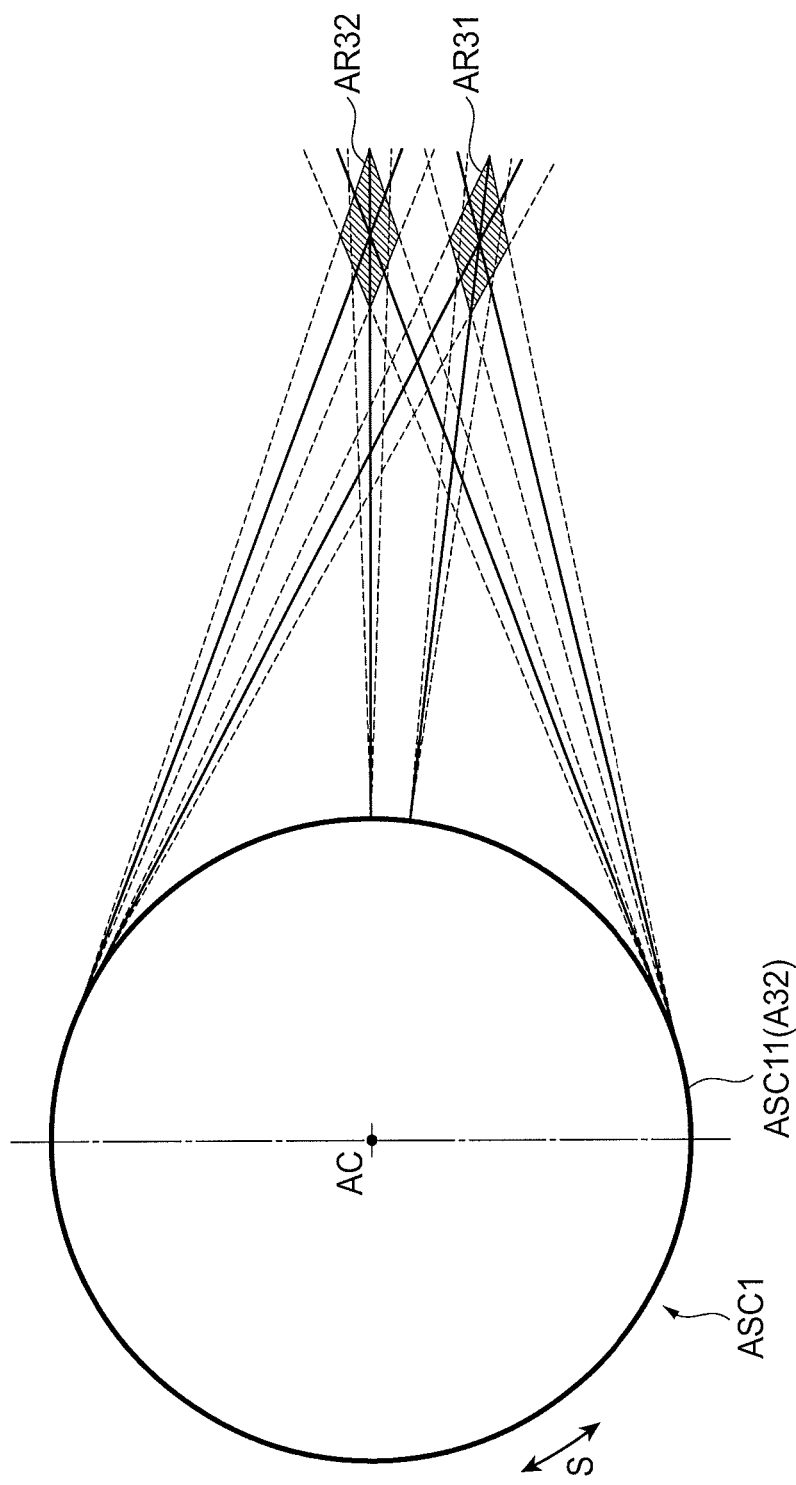
FIG. 27 is a diagram schematically showing a reflection state of image lights projected from projecting sections of a display apparatus in a modification of the fifth embodiment.

FIG. 27 is a diagram schematically showing tracks of image lights projected from the projecting sections APJ of the display apparatus A1B. Note that, in FIG. 27, in order to show a reflection state of light, illustration of the projecting sections adjacent to each other is omitted.

In the modification of this embodiment, an interval between one projecting section APJ and the other projecting section APJ not shown in the figure (specifically, the interval between the optical axis of the not-shown projection optical device of one projecting section APJ and the optical axis of the not-shown projection optical device of the other projecting section APJ) is set to approximately 65 mm, which is the eye interval of the standard person (the observer H).

With such a configuration, as shown in FIG. 27, the image lights respectively projected from the not-shown projecting sections APJ are projected on the external circumferential surface ASC11 of the screen ASC1. Since the screen ASC1 is configured by the retroreflective layer A31 and the diffusion layer A32, the image lights are reflected while being slightly diffused in the circumferential direction S. Consequently, appropriate viewing ranges AR31 and AR32 are formed.

Effects of the Modification of the Fifth Embodiment

With the display apparatus according to the modification of the fifth embodiment, effects same as the effects of the embodiments explained above are attained. Besides, effects explained below are attained.

In the modification of this embodiment, when it is determined that the observer H is absent in the detection ranges, that is, when the observer H is away from the screen ASC1, the images having the single color of black is projected from all the projecting sections APJ. Therefore, it is possible to make the screen ASC1 less conspicuous.

On the other hand, when the power supply of the projection device A3B (the projecting sections APJ) is controlled to off, it is possible to attain power saving of the display apparatus A1B.

Further, the arrangement interval of the plurality of projecting sections APJ is set to, for example, approximately 65 mm. Therefore, lights of images projected from the projecting sections APJ are reflected by the screen ASC1 and collected in a position on a straight light extending along the T direction and passing the pupil positions of the projecting sections APJ. The image projected from one of the projecting sections APJ adjacent to each other is reflected by the screen ASC1 and observed by the right eye of the observer H. The image projected from the other is reflected by the screen ASC1 and observed by the left eye of the observer H. Consequently, by observing the projection images by the projecting sections APJ as parallax images, the observer H can stereoscopically recognize the observation target included in the respective projection images through the binocular parallax.

Sixth Embodiment

A display apparatus according to a sixth embodiment of the invention is explained.

The display apparatus according to this embodiment has a configuration same as the configuration of the display apparatus A1 and the like. However, the display apparatus according to this embodiment is different from the display apparatuses A1 and A1B in that the display apparatus includes a display unit including the projection device and a screen unit including a screen and the display apparatus is configured by attaching the display unit and the screen unit to a columnar body provided in a building or the like. Note that, in the following explanation, components the same as or substantially the same as the components explained above are denoted by the same reference numerals and signs and explanation of the components is omitted.

Schematic Configuration of the Display Apparatus

Figure 28:
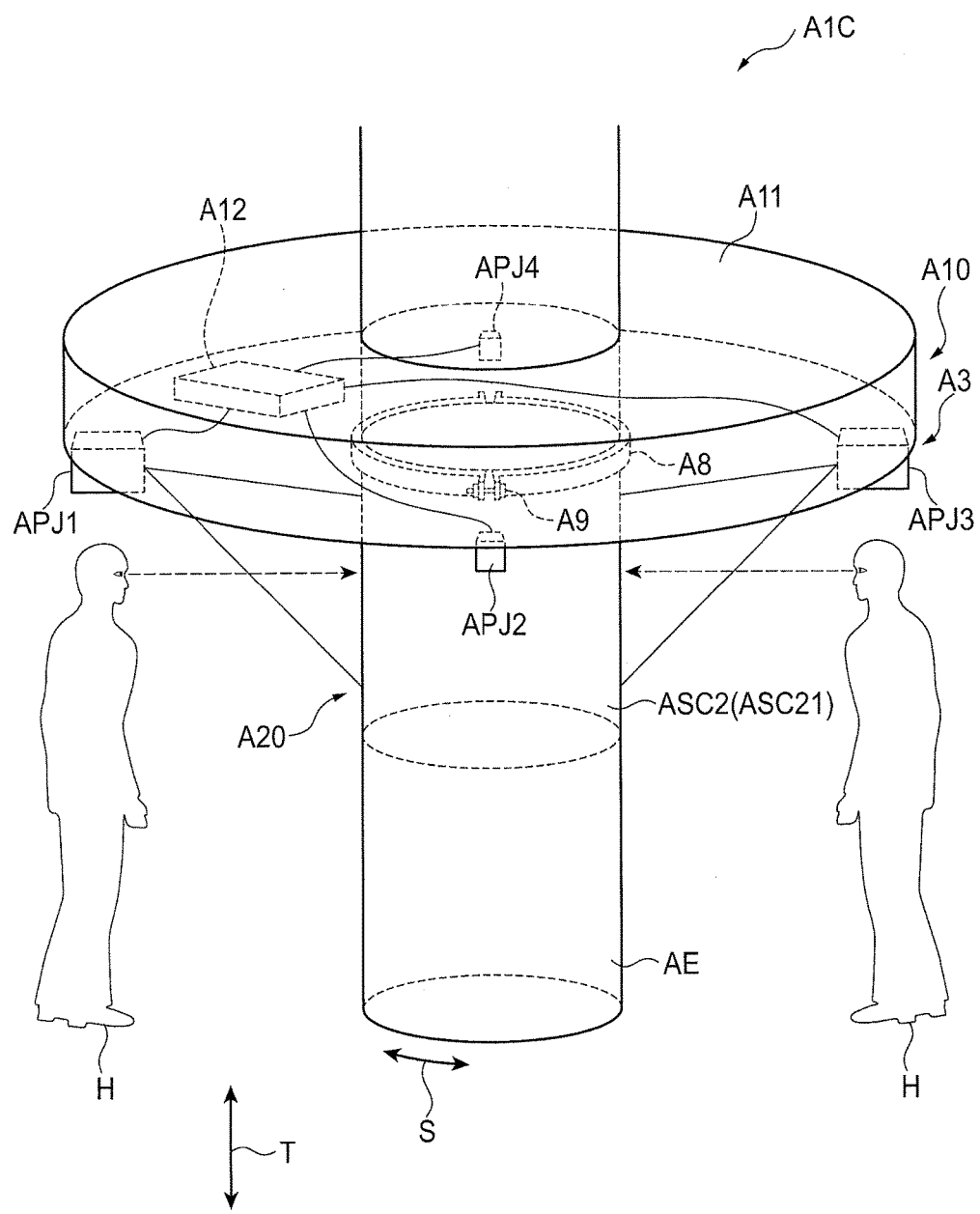
FIG. 28 is a schematic diagram showing the external view of a display apparatus according to a sixth embodiment of the invention.

FIG. 28 is a schematic diagram showing a display apparatus A1C according to the sixth embodiment.

The display apparatus A1C according to this embodiment includes, as shown in FIG. 28, an attachment section A8, a metal fitting A9, a display unit A10, and a screen unit A20. The display unit A10 and the screen unit A20 are attached to a columnar pillar AE. Consequently, like the display apparatus A1, the display apparatus A1C displays an image of an observation target observed from the position of an observer H and causes the observer H to stereoscopically visually recognize the observation target through the motion parallax.

Configuration of the Screen Unit

Figure 29:
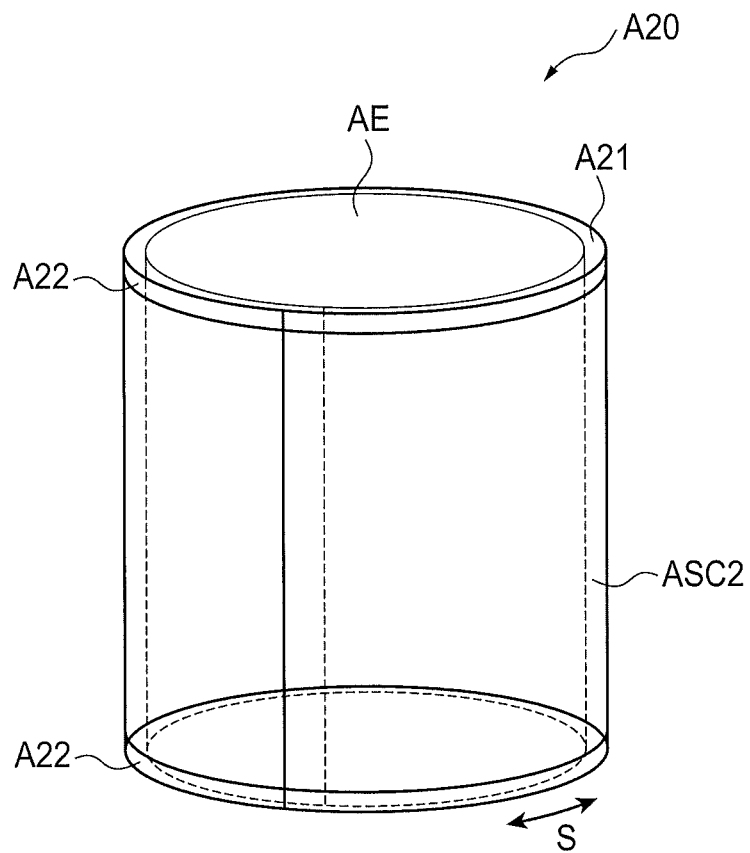
FIG. 29 is a schematic perspective view showing the configuration of a screen unit in the sixth embodiment.

FIG. 29 is a schematic perspective view showing the configuration of the screen unit A20.

The screen unit A20 displays an image projected from the display unit A10. The screen unit A20 includes, as shown in FIG. 29, a screen ASC2, a buffer material A21, and bands A22.

The screen ASC2 is configured the same as the screen ASC1 except that the screen ASC2 is formed in a sheet shape and attached to the pillar AE.

The buffer material A21 fills a gap between the pillar AE and the screen ASC2 and absorbs unevenness of the pillar AE. The buffer material. A21 can be formed of, for example, urethane.

The bands A22 are located on the outer side of the buffer material A21 and the screen ASC2 and wound around the pillar AE to attach the buffer material A21 and the screen ASC2 to the pillar AE. That is, the band A22 is equivalent to the attachment member according to the invention.

When the screen unit A20 is configured, first, the buffer material A21 is wound around the pillar AE. Thereafter, the sheet-like screen ASC2 is wound to cover the buffer material A21. Both ends of the screen ASC2 are fixed by the bands A22. Consequently, the screen unit A20 (the screen ASC2) is attached to the pillar AE.

Note that the screen ASC2 and the buffer material A21 can be removed from the pillar AE by unwinding the bands A22 from the pillar AE.

Configuration of the Display Unit

Figure 30:
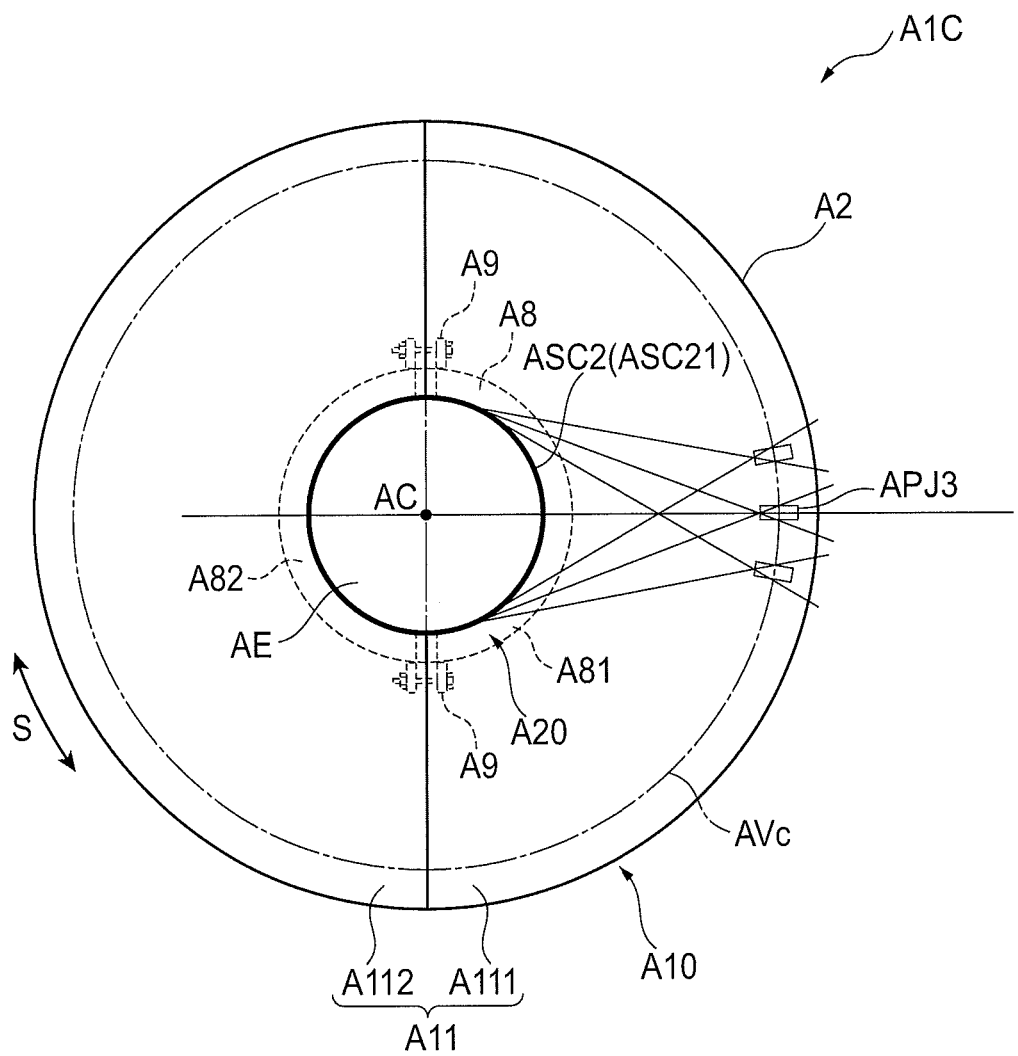
FIG. 30 is a plan view of a display unit attached to a pillar viewed from a direction along the center axis of the pillar in the sixth embodiment.

FIG. 30 is a plan view of the display unit A10 attached to the pillar AE viewed from a direction along the center axis of the pillar AE.

The display unit A10 includes, as shown in FIG. 28, a housing section A11, a control box A12, and the projection device A3 including the plurality of projecting sections APJ.

As shown in FIG. 30, the annular housing section A11 is configured by a first housing section A111 and a second housing section A112 and configured to be dividable when being attached to the columnar pillar AE.

In the control box A12, the storage device A4 and the display control device A5 are incorporated. The control box A12 is connected to the projecting sections APJ of the projection device A3.

The projecting sections APJ of the projection device A3 are respectively provided at a predetermined interval on the imaginary circle AVc centering on the center axis AC such that projecting directions of images of the projecting sections APJ face the center axis AC (coaxial with the center axis of the pillar AE) of the screen ASC2.

Consequently, a video signal is output from the display control device A5 incorporated in the control box A12. Images corresponding to the respective projecting sections APJ (images corresponding to the video signal) are projected on the screen ASC2 from the plurality of projecting sections APJ.

Attachment Structure of the Display Unit

The display unit A10 is attached to the pillar AE by the attachment section A5 and the metal fitting A9.

The annular attachment section A8 is configured by a first attachment section A81 and a second attachment section A82 made of metal and is configured to be dividable when being attached to the columnar pillar AE. When the first attachment section A81 and the second attachment section A82 are fixed by the metal fitting A9 while holding the pillar AE, the attachment section A8 is indirectly fixed to the pillar AE.

The first housing section A111 and the second housing section A112 are put on the attachment section A8 and fixed by not-shown bolts. Consequently, the display unit A10 is attached to the pillar AE.

Effects of the Sixth Embodiment

With the display apparatus A1C according to the sixth embodiment, effects same as the effects of the fourth embodiment are attained. Besides, effects explained below are attained.

In this embodiment, since the screen ASC2 is attached to the pillar AE by the bands A22, a stereoscopic image can be displayed centering on the pillar AE. Therefore, it is possible to cause the observer to unprecedentedly feel as if a solid object is present on the inside of the pillar AE.

Since the existing pillar can be used, complicated work is unnecessary. The existing pillar can be used as the screen. For example, by attaching the screen to a columnar pillar in a station, the pillar can be used as an advertisement medium. Further, since the display apparatus A1C includes the bands A22, it is possible to quickly and easily execute installation and removal of the sheet-like screen ASC2.

Since the screen ASC2 is wound to cover the buffer material A21, even if unevenness is present on the surface of the columnar pillar AE more or less, it is possible to reduce the influence on an outer circumferential surface ASC22 of the screen ASC2. Further, since the screen ASC2 includes the retroreflective layer A31 and the diffusion layer A32, a diffusion angle in the circumferential direction S is smaller than a diffusion angle in the T direction. Therefore, it is possible to reduce the influence of the unevenness of the columnar pillar AE.

Modification of the Embodiments

The invention is not limited to the embodiments. Modifications, improvements, and the like are included in the invention as long as the purpose of the invention can be achieved.

In the first to third embodiments, the retroreflective layer 31 and the diffusion layer 32 are provided on the substrate 30. However, the invention is not limited to this. For example, a structure such as a metallic cylinder or a cylinder of acrylic resin or the like for fixing the retroreflective layer 31 and the diffusion layer 32 may be provided. When the structure is acrylic resin and colorless and transparent, the diffusion layer 32 may be stuck to the outer circumferential surface of the structure and the retroreflective layer 31 may be stuck to the outer side of the diffusion layer 32. In short, any configuration may be adopted as long as light is made incident on the retroreflective layer 31 and the diffusion layer 32 in this order.

In the first to third embodiments, the screens SC1 and SC1A are formed in the substantially columnar shape and the screen SC2 is formed in the substantially semi-columnar shape. However, the invention is not limited to this. The screens may be formed in any shape as long as the screens include at least arcuate portions.

In the first to third embodiments, as the projecting section PJ, for example, a projector can be illustrated. However, the invention is not limited to this. For example, only the projection optical device may be provided as the projecting section PJ. In this case, image data formed by a not-shown image forming apparatus may be directly transmitted to the projection optical device. An image corresponding to the position of the projection optical device may be projected from the projection optical device.

In the first and second embodiments, the plurality of projecting sections PJ are provided at the lower end of the screen SC1, that is, at the upper end on the T direction side of the stands 6 and 6A. However, the invention is not limited to this. For example, the projecting sections PJ may be provided at the upper end, which is the other end side, of the screen SC1.

In the second and third embodiments, the images formed by the image lights are reversed by the plurality of reflection mirrors M. Therefore, the display control devices 5 and 5B control the projecting sections PJ in advance to project the image lights for forming reversed images. However, the invention is not limited to this. For example, image information of the reversed images may be stored in the storage devices 4 and 4B.

In the third embodiment, the turning electrode 10 is provided. However, the invention is not limited to this. For example, radio may be used for the video signal and the output from the camera 9. Electromagnetic coupling by a coil may be used for the power supply. Consequently, as in the case in which the turning electrode 10 is provided, since a cable is not used, it is possible to turnably hold the turning table 7 on the stand 6B.

In the third embodiment, the display apparatus 1B includes the plurality of sensors 8 and the camera 9. However, the invention is not limited to this. For example, the display apparatus 1B may include a plurality of cameras 9 without including the plurality of sensors 8. Consequently, an image of the face of the observer H can be surely taken by the plurality of cameras 9 from the initial stage. The position of the face of the observer H can be detected by the direction detection circuit 12. Therefore, when the observer H is located near the display apparatus 1B, the turning table 7 instantaneously turns. The observer H can recognize an image projected on the screen SC2.

In the display control processing in the third embodiment, the processing in steps S19 to S25 may be repeatedly executed. Consequently, the screen SC2 can be always right opposed to the observer H. Note that, when the observer H moves beyond the image pickup range of the camera 9, the processing in steps S11 to S25 only has to be performed again from step 311.

In the fourth to sixth embodiments, as the projecting section APJ, for example, a projector can be illustrated. However, the invention is not limited to this. For example, only the projection optical device may be provided as the projecting section PJ. In this case, image data formed by a not-shown image forming apparatus may be directly transmitted to the projection optical device. An image corresponding to the position of the projection optical device may be projected from the projection optical device.

In the fourth to sixth embodiments, the projecting sections APJ of the projection devices A3 and A3B are fixed in the positions set in advance. However, the invention is not limited to this. For example, a rail may be provided on the imaginary circle AVc on which the projecting sections APJ are arranged. The projecting sections APJ may be moved along the rail. Further, if various sensors and a camera are provided to detect the position of the observer H, the projecting sections APJ can be freely moved to the detected position of the observer H. Consequently, it is possible to reduce the number of the projecting sections APJ of the projection devices A3 and A3A. It is possible to reduce manufacturing costs of the display apparatuses A1, A1B, and A1C.

In the fourth and fifth embodiments, the retroreflective layer A31 and the diffusion layer A32 are provided on the substrate A30. However, the invention is not limited to this. For example, a structure such as a metallic cylinder or a cylinder of acrylic resin or the like for fixing the retroreflective layer A31 and the diffusion layer A32 may be provided. When the structure is acrylic resin and colorless and transparent, the diffusion layer A32 may be stuck to the outer circumferential surface of the structure and the retroreflective layer A31 may be stuck to the outer side of the diffusion layer A32. In short, any configuration may be adopted as long as light is made incident on the retroreflective layer A31 and the diffusion layer A32 in this order.

In the sixth embodiment, the screen ASC2 is configured the same as the screen ASC1 except that the screen ASC2 is formed in a sheet shape. However, the invention is not limited to this. For example, the screen ASC2 may be configured by directly sticking the retroreflective layer A31 and the diffusion layer A32 without providing the substrate A30. Consequently, since the screen ASC2 can be formed thinner, it is possible to easily wind the screen ASC2 around the columnar pillar AE.

In the fourth and fifth embodiments, the screens ASC1 and ASC1A are formed in the substantially cylindrical shape. However, the invention is not limited to this. The screens may be formed in any shape as long as the screens include at least arcuate portions.

In the sixth embodiment, when determining that the observer H is present within the detection ranges, the display control device A5B controls all the projecting sections PJ. However, the invention is not limited to this. For example, the display control device A5B may control only the projecting section APJ to which the sensor A7 that detects the observer H is attached and the projecting sections APJ provided on both sides of the projecting section APJ. Consequently, compared with when all the projecting sections APJ are controlled, it is possible to reduce power consumption.

In the fifth embodiment, the display apparatus A1B includes the plurality of sensors A7. However, the invention is not limited to this. For example, the display apparatus A1B may include a plurality of cameras without including the plurality of sensors A7. Consequently, it is possible to easily discriminate, with the plurality of cameras, whether the observer H is present in the appropriate viewing range of the screen ASC1.

In the sixth embodiment, the screen ASC2 is fixed to the columnar pillar AE. However, the invention is not limited to this. For example, the pillar AE does not have to be formed in the columnar shape as long as the pillar AE includes an arcuate portion. Consequently, at least apart of the screen ASC2 can be formed in an arcuate shape.

In the sixth embodiment, the bands A22 are provided and the screen ASC2 is fixed to the columnar pillar AE by the bands A22. However, the invention is not limited to this. For example, an adhesive layer may be provided on the inner circumferential surface of the screen ASC2 to directly stick the screen ASC2 to the columnar pillar AE.

The entire disclosure of Japanese Patent Application No. 2014-119346, filed Jun. 10, 2014 and Japanese Patent Application No. 2014-1.19347, filed Jun. 10, 2014 are expressly incorporated by reference herein.

What is claimed is:

1. A display apparatus comprising:
   a screen formed in an arcuate shape centering on a center axis; and
   a projection device includes a plurality of projecting sections configured to project images corresponding to projecting directions on an inner circumferential surface of the screen along the projecting directions orthogonal to the center axis and different from one another, wherein
   the screen includes:
      a retroreflective layer having a reflection surface directed to the projection device; and
      a diffusion layer arranged on the projection device side with respect to the retroreflective layer and configured to diffuse, when transmitting light made incident from the retroreflective layer, the light wider in a first direction along the center axis than in a second direction, which is a circumferential direction centering on the center axis.

2. The display apparatus according to claim 1, wherein the projection device includes the plurality of projecting sections respectively arranged on an imaginary circle centering on the center axis and configured to project images corresponding to the projecting directions on the inner circumferential surface along the projecting directions different from one another.

3. The display apparatus according to claim 2, wherein the plurality of projecting sections are arranged on one of one end side and the other end side in the first direction with respect to the screen.

4. The display apparatus according to claim 1, further comprising:
   a position detecting section configured to detect a position of an observer who observes the inner circumferential surface;

a turning section configured to relatively turn the screen and the projection device about the center axis in a state in which the projection device can project the image on the inner circumferential surface; and a turning control section configured to control the turning section on the basis of a detection result by the position detecting section to enable the observer to observe the image projected on the inner circumferential surface, wherein the projection device projects the image corresponding to the position of the observer.

5. The display apparatus according to claim 4, wherein the position detecting section includes:
   a sensor configured to detect the position of the observer with respect to the screen;
   a camera configured to take an image of the observer detected by the sensor; and
   a specifying section configured to specify a position of a predetermined part of the observer on the basis of the picked-up image taken by the camera, and
   the projection device projects the image corresponding to the predetermined part of the detected observer.

6. The display apparatus according to claim 1, further comprising a reflection member configured to reflect image light projected from the projection device toward a projection position corresponding to the image light among a plurality of projection positions on the inner circumferential surface, wherein
   the projection device and the reflection member are arranged in an imaginary circle centering on the center axis and having a diameter dimension same as a diameter dimension of the screen.

7. The display apparatus according to claim 2, wherein an arrangement interval of projecting sections adjacent to each other among the plurality of projecting sections is set such that an image projected from one of the adjacent projecting sections is observed by a right eye of an observer who observes the screen and an image projected from the other is observed by a left eye of the observer.

8. A display apparatus comprising:
   a screen formed in an arcuate shape centering on a center axis; and
   a projection device includes a plurality of projecting sections respectively arranged along an imaginary circle centering on the center axis and configured to project, along projecting directions orthogonal to the center axis and different from one another, images corresponding to the projecting directions on an outer circumferential surface of the screen, wherein
   the screen includes:
   a retroreflective layer having a reflection surface directed to the projection device; and
   a diffusion layer arranged on the projection device side with respect to the retroreflective layer and configured to diffuse, when transmitting light made incident from the retroreflective layer, the light wider in a first direction along the center axis than in a second direction, which is a circumferential direction centering on the center axis.

9. The display apparatus according to claim 8, further comprising a holding section that holds the plurality of projecting sections in a position higher than positions of the screen and an observer who observes the screen.

10. The display apparatus according to claim 8, further comprising:
    an observer detecting section configured to detect an observer who observes the outer circumferential surface;
    a determining section configured to determine whether the observer is detected by the observer detecting section; and
    a control section configured to cause, when the determining section determines that the observer is detected, the plurality of projecting sections to respectively project images corresponding to the projecting directions on the outer circumferential surface and cause, when the determining section determines that the observer is not detected, the plurality of projecting sections to project images different from the images corresponding to the projecting directions on the outer circumferential surface.

11. The display apparatus according to claim 8, further comprising:
    an observer detecting section configured to detect an observer who observes the outer circumferential surface;
    a determining section configured to determine whether the observer is detected by the observer detecting section; and
    a control section configured to turn off, when the determining section determines that the observer is not detected, a power supply of at least any one projecting section among the plurality of projecting sections.

12. The display apparatus according to claim 8, wherein an arrangement interval of projecting sections adjacent to each other among the plurality of projecting sections is set such that an image projected from one of the adjacent projecting sections is observed by a right eye of an observer who observes the screen and an image projected from the other is observed by a left eye of the observer.

13. The display apparatus according to claim 8, further comprising an attachment member configured to detachably attach the screen formed in a sheet shape to a columnar body.

* * * * *